United States Patent
Saito et al.

(10) Patent No.: US 9,158,064 B2
(45) Date of Patent: Oct. 13, 2015

(54) METHOD FOR PRODUCING BUNDLE STRUCTURE INCLUDING A PLURALITY OF OPTICAL FIBERS, METHOD FOR CONNECTING OPTICAL FIBERS, BUNDLE TERMINAL STRUCTURE COMPRISING CAPILLARY AND OPTICAL FIBERS, AND FIBER CONNECTION STRUCTURE COMPRISING BUNDLE TERMINAL STRUCTURE COMPRISING CAPILLARY AND OPTICAL FIBERS

(71) Applicant: FURUKAWA ELECTRIC CO., LTD., Tokyo (JP)

(72) Inventors: Tsunetoshi Saito, Tokyo (JP); Kengo Watanabe, Tokyo (JP)

(73) Assignee: FURUKAWA ELECTRIC CO., LTD., Tokyo (JP)

(*) Notice: Subject to any disclaimer, the term of this patent is extended or adjusted under 35 U.S.C. 154(b) by 101 days.

(21) Appl. No.: 14/021,680

(22) Filed: Sep. 9, 2013

(65) Prior Publication Data
US 2014/0010501 A1    Jan. 9, 2014

Related U.S. Application Data

(63) Continuation of application No. PCT/JP2012/055931, filed on Mar. 8, 2012.

(30) Foreign Application Priority Data

Mar. 9, 2011  (JP) .................................. 2011-051235

(51) Int. Cl.
G02B 6/38    (2006.01)
G02B 6/02    (2006.01)
(Continued)

(52) U.S. Cl.
CPC .......... *G02B 6/02042* (2013.01); *G02B 6/2551* (2013.01); *G02B 6/3885* (2013.01); *G02B 6/403* (2013.01)

(58) Field of Classification Search
CPC .... G02B 6/3885; G02B 6/40; G02B 6/02042; G02B 6/2351; G02B 6/403
USPC ...................................... 385/70–88
See application file for complete search history.

(56) References Cited

U.S. PATENT DOCUMENTS

| | | | | |
|---|---|---|---|---|
| 5,748,820 A | * | 5/1998 | Le Marer et al. .............. | 385/76 |
| 2008/0069502 A1 | * | 3/2008 | Ma .................................. | 385/77 |

(Continued)

FOREIGN PATENT DOCUMENTS

| | | |
|---|---|---|
| EP | 0400856 A1 | 12/1990 |
| JP | 55-096905 A | 7/1980 |

(Continued)

OTHER PUBLICATIONS

International Search Report corresponding to PCT/JP2012/055931, dated Apr. 30, 2012.

(Continued)

*Primary Examiner* — Akm Enayet Ullah
(74) *Attorney, Agent, or Firm* — Hauptman Ham, LLP

(57) ABSTRACT

A multicore fiber has a plurality of cores formed at predetermined distances and surrounded by a cladding. A bundle structure includes optical fibers joined in a close-packed arrangement. Specifically, one optical fiber is arranged at a center, and six optical fibers are arranged around the optical fiber arranged at the center. Accordingly, cores of the optical fibers are arranged at equal distances. The optical fibers are bonded together with an adhesive. Accordingly, claddings of adjacent optical fibers are in contact with each other either directly or via the adhesive. The adhesive also fills spaces between the optical fibers.

18 Claims, 17 Drawing Sheets

(51) Int. Cl.
   *G02B 6/40*   (2006.01)
   *G02B 6/255*  (2006.01)

(56) References Cited

U.S. PATENT DOCUMENTS

| | | |
|---|---|---|
| 2009/0136182 A1 | 5/2009 | Oshima |
| 2010/0195965 A1 | 8/2010 | Sasaoka |
| 2010/0290750 A1 | 11/2010 | Inamura |

FOREIGN PATENT DOCUMENTS

| | | |
|---|---|---|
| JP | 56-083712 B2 | 7/1981 |
| JP | 58-014108 A | 1/1983 |
| JP | 62-047604 A | 3/1987 |
| JP | 62-129507 U | 8/1987 |
| JP | 63-307409 A | 12/1988 |
| JP | 02-082212 A | 3/1990 |
| JP | 03-012607 A | 1/1991 |
| JP | 04-104104 A | 4/1992 |
| JP | 09-061632 A | 3/1997 |
| JP | 2004-101989 A | 4/2004 |
| JP | 2007-279194 A | 10/2007 |
| JP | 2007-316480 A | 12/2007 |
| JP | 2008-070675 A | 3/2008 |
| JP | 2008-083155 A | 4/2008 |
| JP | 2010-152163 A | 7/2010 |
| JP | 2010-286661 A | 12/2010 |
| JP | 2011-018013 A | 1/2011 |
| JP | 2012-022176 A | 2/2012 |

OTHER PUBLICATIONS

Extended European Search Report issued Jan. 22, 2015, corresponding to European patent application No. 12754906.1.

\* cited by examiner (a)

(b)   (c)

(d)

(a)

(b)

(a)

(b)

(a)

(b)

(a)

(b)

(a)

(b)

(a)

(b)

METHOD FOR PRODUCING BUNDLE STRUCTURE INCLUDING A PLURALITY OF OPTICAL FIBERS, METHOD FOR CONNECTING OPTICAL FIBERS, BUNDLE TERMINAL STRUCTURE COMPRISING CAPILLARY AND OPTICAL FIBERS, AND FIBER CONNECTION STRUCTURE COMPRISING BUNDLE TERMINAL STRUCTURE COMPRISING CAPILLARY AND OPTICAL FIBERS

RELATED APPLICATIONS

The present application is a continuation of International Application Number PCT/JP2012/055931, filed Mar. 8, 2012, and claims priority from, Japanese Application Number 2011-051235, filed Mar. 9, 2011. The above listed applications are hereby incorporated by reference in their entirety.

TECHNICAL FIELD

The present invention relates to a method for producing a bundle structure in which a multicore fiber having a plurality of cores and a plurality of optical fibers are bundled together, etc.

BACKGROUND ART

The transmission capacity of single-core optical fibers that are currently used is approaching its limit due to the rapidly increasing volume of optical communication traffic. In response to this situation, a multicore fiber in which multiple cores are formed in one fiber has been proposed as a means for increasing the communication capacity.

One example of such a multicore fiber has a plurality of core portions formed inside a cladding portion, and a part of the circumference of the cladding portion has a flat portion that is perpendicular to a longitudinal direction (Patent Document 1).

To use a multicore fiber as a transmission path, it is necessary to connect each core portion of the multicore fiber to a corresponding core portion of another multicore fiber, a different optical fiber, an optical device, or the like in order to send and receive transmission signals. A method of connecting such a multicore fiber to a single core fiber has been proposed in which the multicore fiber is connected to a fiber bundle including single-core optical fibers arranged at positions corresponding to core portions of the multicore fiber in order to send and receive transmission signals (Patent Document 2). A method of producing such an optical fiber bundle is also proposed in which a plurality of single-core fibers is bundled together by bonding or the like at predetermined distances (Patent Document 3).

PRIOR ART DOCUMENT

Patent Documents

[Patent Document 1] JP 2010-152163 A
[Patent Document 2] JP 62-047604 A
[Patent Document 3] JP 03-012607 A

SUMMARY OF THE INVENTION

Technical Problem

In order to connect each core portion of a multicore fiber to individual optical fibers as described above, it is necessary to connect an end surface of the multicore fiber to the individual optical fibers such that core portions of the multicore fiber are optically precisely connected to corresponding core portions of the individual optical fibers, respectively. However, in general, the distance between core portions of a multicore fiber is small (for example, 40 to 50 µm) and, thus, it is not possible to use general optical fibers (outer diameter 125 µm). That is to say, it is necessary to use optical fibers each having an outer diameter that is equal to or smaller than the distance between core portions of a multicore fiber.

However, such optical fibers are so thin that it is not easy to handle. Furthermore, especially in a case of a single mode fiber, an extremely high level of positional precision is required, because a deviation in the position of a connecting portion must not exceed 1 to 2 µm.

On the other hand, when a fiber bundle is formed by a conventional method using external mechanical pressure or the like as described in Patent Document 3, the positions of cores of single core fibers cannot be arranged as intended to cause slight deviations in the core distances. This results in positional deviation from cores of a multicore fiber to be connected to lead to optical losses. Currently, no adequate method for the precise alignment of a multicore fiber with optical fibers with reduced optical losses has been proposed.

The present invention is in view of the foregoing problems, the object of the present invention is to provide a method for producing a bundle structure of optical fibers, a method for connecting such a bundle structure, and the like that enable precise alignment and reliable optical connection of a multicore fiber having core portions with a small pitch.

Technical Solution

To attain the above described object, the first invention is directed to a method for producing a bundle structure including a plurality of optical fibers connectable to a multicore fiber having a plurality of cores, the method comprising: inserting a plurality of optical fibers arranged substantially in a close-packed arrangement into a capillary such that distal ends of the plurality of optical fibers stick out from an end surface of the capillary by an identical length; bringing the distal ends of the plurality of optical fibers into contact with a first adhesive so that the plurality of optical fibers are tightly attached and bonded together by surface tension of the first adhesive; and after the first adhesive is cured, fixing the capillary and the plurality of optical fibers to each other with a second adhesive and polishing the end surface of the capillary to obtain the plurality of optical fibers arranged in a close-packed arrangement.

Further, a method for producing a bundle structure including a plurality of optical fibers connectable to a multicore fiber having a plurality of cores includes: inserting a plurality of optical fibers arranged substantially in a close-packed arrangement into a temporary arrangement member such that distal ends of the plurality of optical fibers stick out from an end surface of the temporary arrangement member by an identical length; bringing the distal ends of the plurality of optical fibers into contact with a first adhesive so that the plurality of optical fibers are tightly attached and bonded together by surface tension of the first adhesive to form an optical fiber bundle; and after the first adhesive is cured, removing the optical fiber bundle from the temporary arrangement member and polishing an end surface of the optical fiber bundle to obtain the optical fiber bundle arranged in a close-packed arrangement. In this case, the method can further include, before the end surface of the optical fiber bundle is polished, inserting the optical fiber bundle into a capillary, fixing the optical fiber bundle and the capillary to each other with a second adhesive, and polishing the end surface of the optical fiber bundle together with the end surface of the capillary.

Desirably, the refractive index of the first and second adhesive is less than the refractive index of claddings constituting the plurality of optical fibers.

The first adhesive can be a solution based adhesive, and the concentration of a main component of the adhesive with respect to the solution can be 50% or lower. The first adhesive can have a cure shrinkage percentage of 10% or higher. The first adhesive can have a viscosity of 100 cps or lower. The second adhesive having been cured can have a Shore D hardness of 60 or higher.

The phrase "a cure shrinkage percentage of 10% or higher" means that when the volume of an adhesive that has been cured is compared with the original volume of the adhesive before it is cured, the volume of the adhesive that has been cured decreases by 10% or more from the original volume of the adhesive before it is cured.

A hexagonal hole corresponding to the close-packed arrangement of the plurality of optical fibers can be formed in the capillary in which the plurality of optical fibers is to be inserted, and the plurality of optical fibers can be inserted into the hexagonal hole and fixed.

An inner surface of the capillary in which the plurality of optical fibers is to be inserted can have a protrusion formed at a position corresponding to at least one depressed portion of a circumference formed between any of the plurality of optical fibers arranged in the close-packed arrangement.

According to the first invention, the optical fibers arranged in the close-packed arrangement are bundled together to be integrated so that the optical fibers are at equal distances. This enables reliable alignment of the optical fibers with respective core portions of a multicore fiber arranged at predetermined distances.

Further, use of the surface tension of the adhesive makes it possible to precisely bond the optical fibers together with ease in the close-packed arrangement to fix the optical fibers at predetermined distances. Especially, by use of a solution based adhesive having a low viscosity as the first adhesive, the optical fibers can reliably be attached together tightly by surface tension and, furthermore, the volume of the adhesive decreases after it is cured so that a thin bonding layer can be formed. Moreover, the hardness of the second adhesive is increased to prevent the optical fibers from being damaged during the polishing thereafter.

Further, the optical fibers are fixed together with the adhesive, and the refractive index of the adhesive with which the optical fibers are bonded together is less than the refractive index of claddings constituting the optical fibers, whereby leakage of light from the optical fibers can be reduced.

Further, the hexagonal hole corresponding to the close-packed arrangement of the optical fibers is formed in the capillary in which the optical fibers are to be inserted, and the optical fibers are inserted into the hexagonal hole and fixed, whereby the arrangement of the optical fibers can be aligned in a certain direction with respect to the capillary.

Further, the inner surface of the capillary in which the optical fibers are to be inserted has a protrusion formed at the position corresponding to the depressed portion of the circumference formed between any of the optical fibers arranged in the close-packed arrangement, whereby the arrangement of the optical fibers can be aligned in a certain direction with respect to the capillary.

The second invention is directed to a method for connecting fibers including: producing a bundle structure by the method for producing a bundle structure according to the first invention; and splicing a multicore fiber inserted in a first capillary to the bundle structure inserted in a second capillary by splicing the first capillary and the second capillary together.

Desirably, the refractive index of a third adhesive with which the multicore fiber and the first capillary are bonded together is less than the refractive index of a cladding of the multicore fiber.

According to the second invention, the plurality of optical fibers and the multicore fiber are respectively inserted in the capillaries and fixed, whereby the connecting portion becomes easy to handle.

In this case, the multicore fiber and the capillary are fixed together with the adhesive, the refractive index of the adhesive with which the multicore fiber and the capillary are bonded together is less than the refractive index of the claddings of the multicore fiber, whereby leakage of light from the multicore fiber in the capillary can be reduced.

The third invention is directed to a method for connecting fibers comprising: producing a bundle structure by the method for producing a bundle structure according to the first invention, and aligning a central core of a multicore fiber with a corresponding core of the bundle structure by active alignment, aligning one or two cores around the central core of the multicore fiber with a corresponding core of the bundle structure by active alignment, and then bonding the multicore fiber and the bundle structure together.

A method for connecting a multicore fiber having a plurality of cores to a bundle structure including a plurality of optical fibers can comprise: inserting a plurality of optical fibers arranged substantially in a close-packed arrangement into a capillary, bonding the plurality of optical fibers and the capillary together with a heat-resistant adhesive, and polishing an end surface of the capillary to form a bundle structure; and connecting the bundle structure by fusion splice to a multicore fiber inserted in another capillary.

A method for connecting a multicore fiber having a plurality of cores to a bundle structure including a plurality of optical fibers can include: heating a plurality of optical fibers arranged substantially in a close-packed arrangement and inserted in a capillary, fusing the plurality of optical fibers and the capillary together, and polishing an end surface of the capillary to form a bundle structure; and connecting the bundle structure by further fusion splice to a multicore fiber inserted in another capillary.

A method for connecting a multicore fiber having a plurality of cores to a bundle structure including a plurality of optical fibers can comprise: inserting the plurality of optical fibers arranged substantially in a close-packed arrangement into a capillary, bonding the plurality of optical fibers and the capillary together with a liquid glass or a glass powder, and polishing an end surface of the capillary to form a bundle structure; and connecting the bundle structure by fusion splice to a multicore fiber inserted in another capillary.

The third invention enables reliable optical connection of the cores of the multicore fiber to the corresponding cores of the optical fiber bundle.

The fourth invention is directed to a bundle terminal structure comprising: a substantially cylindrical capillary; and a plurality of optical fibers, wherein the plurality of optical fibers is inserted in the capillary such that in the capillary, the plurality of optical fibers is substantially in a close-packed arrangement at a cross section thereof and is joined such that adjacent optical fibers of the plurality of optical fibers are in contact with each other, and wherein a space is formed between an inner surface of the capillary and a bundle structure of the plurality of optical fibers joined in a close-packed arrangement.

The fifth invention is directed to a fiber connection structure comprising the bundle terminal structure according to the fourth invention, wherein a space between the capillary and the plurality of optical fibers arranged substantially in the close-packed arrangement is filled with a glass powder, and wherein a terminal portion of the capillary and a terminal portion of a multicore fiber are joined by fusion splice.

The fourth and fifth inventions can provide a bundle structure that can be connected to a multicore fiber with ease and a connection structure in which the bundle structure and a multicore fiber are connected together.

Advantageous Effect of the Invention

The present invention can provide a method for producing a bundle structure of optical fibers and the like that enables reliable optical connection of a multicore fiber having core portions with a small pitch.

BRIEF DESCRIPTION OF THE DRAWINGS

FIG. 1(a) is a front view. FIG. 1(b) is a cross sectional view along the line A-A specified in FIG. 1(a). FIG. 1(c) is a cross sectional view along the line B-B specified in FIG. 1(a). FIG. 1(d) is a view illustrating the arrangement of electrodes with respect to a cross section of a splice portion.

FIG. 2 is a view illustrating a fiber connection structure 1a. FIG. 2(a) is a front view, and FIG. 2(b) is a cross sectional view along the line C-C specified in FIG. 2(a).

FIG. 9(a) is a view illustrating an optical fiber 7a. FIG. 9(b) is a view illustrating a state in which the optical fiber 7a is inserted in the capillary 21c.

FIG. 13 is a view illustrating a method for the alignment of cores of a multicore fiber 3 with cores of the bundle structure 5a.

EMBODIMENTS

Figure 1:
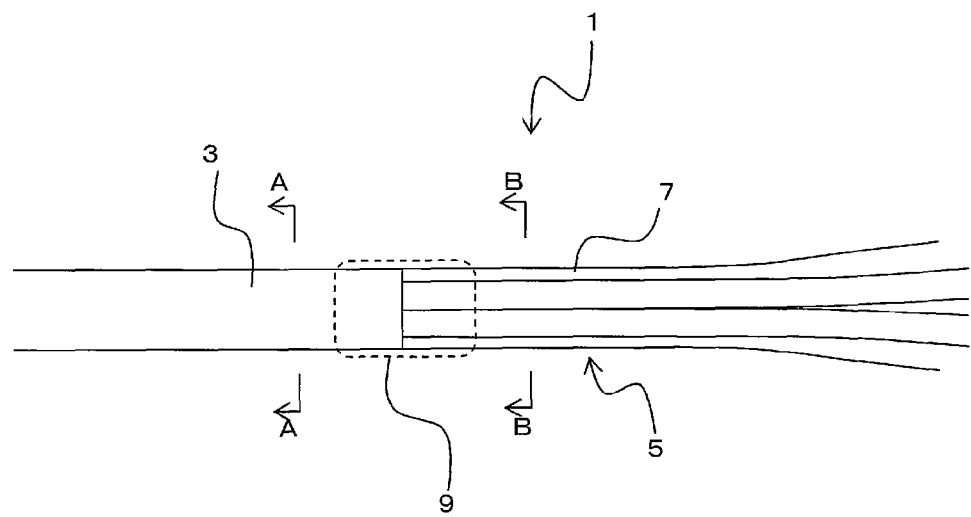
FIG. 1 is a view illustrating a fiber connection structure 1.
Figure 1:
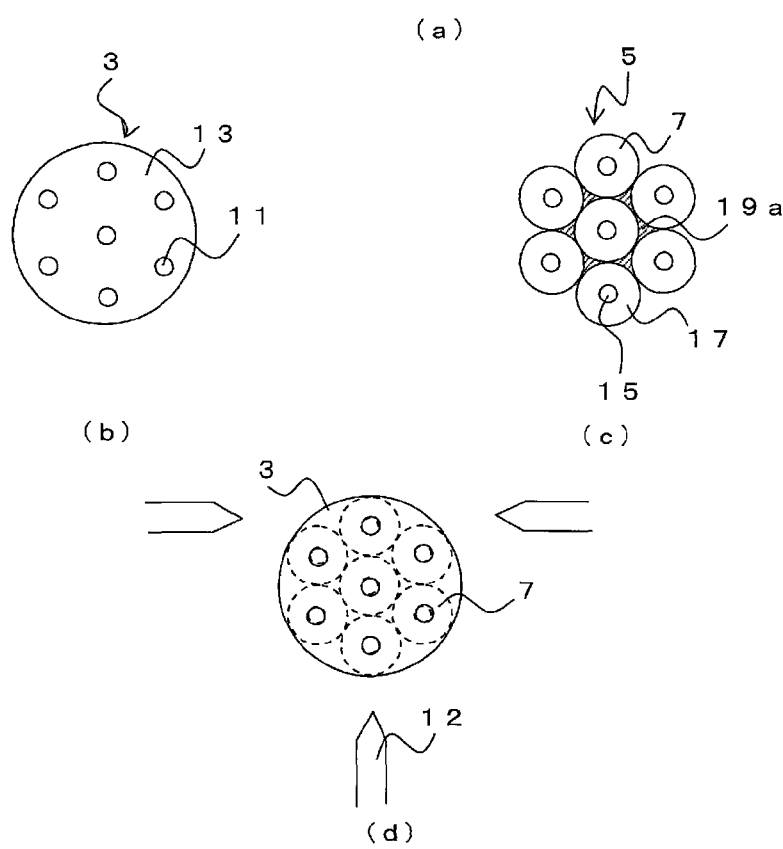

The following describes a fiber connection structure 1. FIG. 1(a) is a front view of the fiber connection structure 1. FIG. 1(b) is a cross sectional view along the line A-A specified in FIG. 1(a). FIG. 1(c) is a cross sectional view along the line B-B specified in FIG. 1(a). The fiber connection structure 1 is a connection structure in which a multicore fiber 3 is connected to a bundle structure 5 in which a plurality of optical fibers 7 is bundled together.

As illustrated in FIG. 1(b), the multicore fiber 3 has a plurality of cores 11 arranged at predetermined distances and a cladding 13 surrounding the cores 11. There are seven cores 11 in total, and the seven cores 11 are respectively formed at the center of the multicore fiber 3 and at vertex positions of a regular hexagon around the central core 11. The six cores 11 around the central core 11 are equidistant from the central core 11. The distances between adjacent cores 11 of the six cores 11 are identical. The pitch of the cores 11 is, for example, about 40 to 50 μm.

In the bundle structure 5, seven optical fibers having the same diameter are joined in a close-packed arrangement. Specifically, one optical fiber 7 is disposed at the center, and six optical fibers 7 are disposed around the central optical fiber 7. Accordingly, cores 15 of the optical fibers 7 are arranged at equal distances. The optical fibers 7 are bonded together with an adhesive 19a. Accordingly, claddings 17 of adjacent optical fibers 7 are in contact with each another either directly or via the adhesive 19a. The adhesive 19a also fills spaces between the optical fibers 7.

The multicore fiber 3 and the optical fibers 7 are made of, for example, silica glass. The present embodiment describes an example of a close-packed arrangement including seven cores in total in which six cores are on the circumference of a central core, but a close-packed arrangement in which additional 12 cores are formed on the circumference is also possible. In other words, the number of cores is not limited in the present invention as long as the cores are arranged in a close-packed arrangement.

However, the present invention is intended to dispose the fibers in a close-packed arrangement by self-alignment using a balance of surface tension of an adhesive or the like having entered spaces between the fibers, and the bundle structure including the seven fibers has the highest precision whereas the bundle structure in which the 12 cores are formed on the circumference of the seven fibers has the second highest precision. The present invention is also applicable to a bundle structure including more fibers, but the precision of alignment of cores (especially on the circumference side) decreases. However, when the number of fibers is increased, the precision of alignment of cores can be prevented from decreasing by forming the bundle structure step by step, for example, by first forming a bundle structure including seven fibers, bonding the seven fibers together, and thereafter bonding 12 fibers to the circumference of the seven fibers by surface tension.

An end surface of the multicore fiber 3 and an end surface of the bundle structure 5 are polished and disposed to face each other. In this state, the cores 11 of the multicore fiber 3 and the cores 15 of the bundle structure 5 face each other at positions where they are to be optically connected to each other. In other words, the pitch of the cores 11 substantially corresponds to the outer diameter of the optical fibers 7 (diameter of cladding 17). Since a bonding layer is to be formed with the adhesive 19a in the spaces between the optical fibers 7, the outer diameter of the optical fibers 7 (cladding 17) may be set to be smaller than the pitch of the cores 11 of the multicore fiber 3 by about 0.1 to 3 μm. In this case, the distances between the cores 15 in the bundle structure including the optical fibers 7 bonded together correspond to the pitch of the cores 11.

As illustrated in FIG. 1(a), the end surface of the multicore fiber 3 and the end surface of the bundle structure 5 are disposed to face each other and fixed to each other with an adhesive 9 at the position where the cores 11 of the multicore fiber 3 are optically connected to the cores 15 of the bundle structure 5. With the end surface of the multicore fiber 3 and the end surface of the bundle structure 5 being disposed to face each other, at least one of the end surfaces is fixed with a jig equipped with a rotation device. Then, for example, signal light is input from an end portion of the multicore fiber 3 that is on the opposite side to the facing end surface of the multicore fiber 3, and the signal light output from end surfaces of the bundled fibers that are on the opposite side to the facing end surfaces of the bundled fibers is received in order to adjust the position and rotation of the fiber bundle (or multicore fiber). The jig is fixed at the position where the light signal output becomes the maximum, and the fibers are connected together by bonding (or fusion splice). Details of the alignment will be described later.

As illustrated in FIG. 1(d), in the case of connecting the fibers by fusion splice, it is desirable to dispose electrodes 12 in three different directions with respect to the cross section of a splice portion and allow each electrode 12 to discharge to fuse the fibers. This enables reliable fusion splice even when the multicore fiber 3 has a large outer diameter. In the case of connecting the fibers by fusion splice, it is desirable to bond the optical fibers 7 together in advance with a heat-resistant (for example about 1000° C.) adhesive (including a metal based adhesive and the like), a liquid glass, or a glass powder.

Since the precision in the positions of the cores of the bundled fibers of the present embodiment arranged in the close-packed arrangement is significantly high, it is only necessary to adjust at least two cores. The alignment can be conducted with ease and high precision if the central core is aligned first followed by alignment of one or two cores around the central core. As might be expected, in order to conduct the alignment with higher precision, it is possible to measure an axial deviation of every core to align each core at the most appropriate position.

The foregoing makes it possible to obtain a connection structure in which the cores 11 of the multicore fiber 3 and the cores 15 of the optical fibers 7 are optically connected together. In the bundle structure 5, the optical fibers 7 are bundled together in the tightest arranged so that constant distances can precisely be maintained between the cores 15.

The following describes a fiber connection structure 1a according to another embodiment. FIG. 2(a) is a front view of the fiber connection structure 1a. FIG. 2(b) is a cross sectional view along the line C-C specified in FIG. 2(a). FIG. 3(a) is a cross sectional view along the line D-D specified in FIG. 2(a). The fiber connection structure 1a is different from the fiber connection structure 1 in that a multicore fiber 3 and optical fibers 7 are inserted into capillaries 21a and 21b, respectively, and the capillaries 21a and 21b are spliced together.

As illustrated in FIG. 2(b), the capillary 21a is a cylindrical member having a hole inside. The hole of the capillary 21a is slightly larger than the outer diameter of the multicore fiber 3. The multicore fiber 3 and the capillary 21a are bonded together with, for example, an adhesive. In this case, the refractive index of the adhesive is desirably less than the refractive index of a cladding 13 of the multicore fiber 3. This makes it possible to prevent leakage of light from the cladding.

Further, as illustrated in FIG. 3(a), a bundle structure 5a includes the optical fibers 7 inserted in the capillary 21b in a close-packed arrangement. The capillary 21b is a cylindrical member having a hole inside. The hole of the capillary 21b has a circular cross section that is slightly larger than the outer diameter of a circumscribed circle of the optical fibers 7 arranged in the close-packed arrangement.

For example, when adjacent optical fibers 7 are in contact with each other and arranged in the close-packed arrangement at the cross section, there is a space of about 1 μm formed between an inner surface of the capillary 21b and the circumscribed circle of the optical fibers 7 arranged in the close-packed arrangement. When seven optical fibers 7 having an outer diameter D (μm) are arranged in the close-packed arrangement, the inner diameter of the capillary 21b is set by 3×D+1 μm.

The optical fibers 7 and the capillary 21b are bonded together with an adhesive 19b. In this case, the refractive index of the adhesive 19b is desirably less than the refractive index of claddings 17 of the optical fibers 7. This makes it possible to prevent leakage of light from the claddings. The adhesive 19b may be the same adhesive as the adhesive 19a. With the optical fibers 7 being inserted in the capillary 21b, the adhesive can fill the space.

End surfaces of the capillaries 21a and 21b are disposed to face each other and bonded together with the adhesive or the like at the position where the cores 11 and the cores 15 are optically connected to each other. As a result, a connection structure can be obtained in which the cores 11 of the multicore fiber 3 and the cores 15 of the optical fibers 7 are optically connected to each other. In the fiber connection structure 1a, end portions of the multicore fiber 3 and the bundle structure 5a are housed in the capillaries 21a and 21b, respectively so that it is easy to handle. Further, since surfaces of the capillaries are spliced together, the splice surfaces are large to allow for reliable splicing. Further, as in the embodiment described above, when the cores are optically connected, active alignment is conducted to bond the capillaries together so that misalignment due to spaces between the fiber bundle and the capillary can be prevented.

As described above, the connection structure according to the present embodiment in which the bundle structure having seven cores and the multicore fiber having seven cores were connected together showed an improvement of 1 dB in loss, the average of the seven cores, compared with a conventional connection structure in which a bundle structure having seven cores and a multicore fiber having seven cores are connected together.

The bundle structure in which the optical fibers 7 are inserted in the capillary 21b can be a bundle structure 5b illustrated in FIG. 3(b). In the bundle structure 5b, the hole of the capillary 21b is not in the shape of a circle but substantially in the shape of a regular hexagon. Specifically, the substantially regular hexagon circumscribes the optical fibers 7 arranged in the close-packed arrangement, and the optical fibers 7 are arranged at vertex portions of the hole, respectively. This regulates the positions of the optical fibers 7 so that the optical fibers 7 are always at constant positions with respect to the capillary 21b. It is to be noted that in FIG. 3(b), each vertex of the hexagon can be in the shape of R that is smaller than the radius of the fibers.

The bundle structure can be a bundle structure 5c illustrated in FIG. 3(c). In the bundle structure 5c, at least a part of an inner surface of the substantially circular hole inside the capillary 21b has a protrusion 23. Specifically, the protrusion 23 is formed on the inner surface of the circumscribed circle that circumscribes the optical fibers 7 arranged in the close-packed arrangement such that the protrusion 23 fits in a depressed portion formed in a space between the optical fibers 7 arranged in the close-packed arrangement. This regulates the positions of the optical fibers 7 so that the optical fibers 7 are always at constant positions with respect to the capillary 21b. Either a single protrusion 23 or a plurality of protrusions 23 can be formed.

Figure 4:
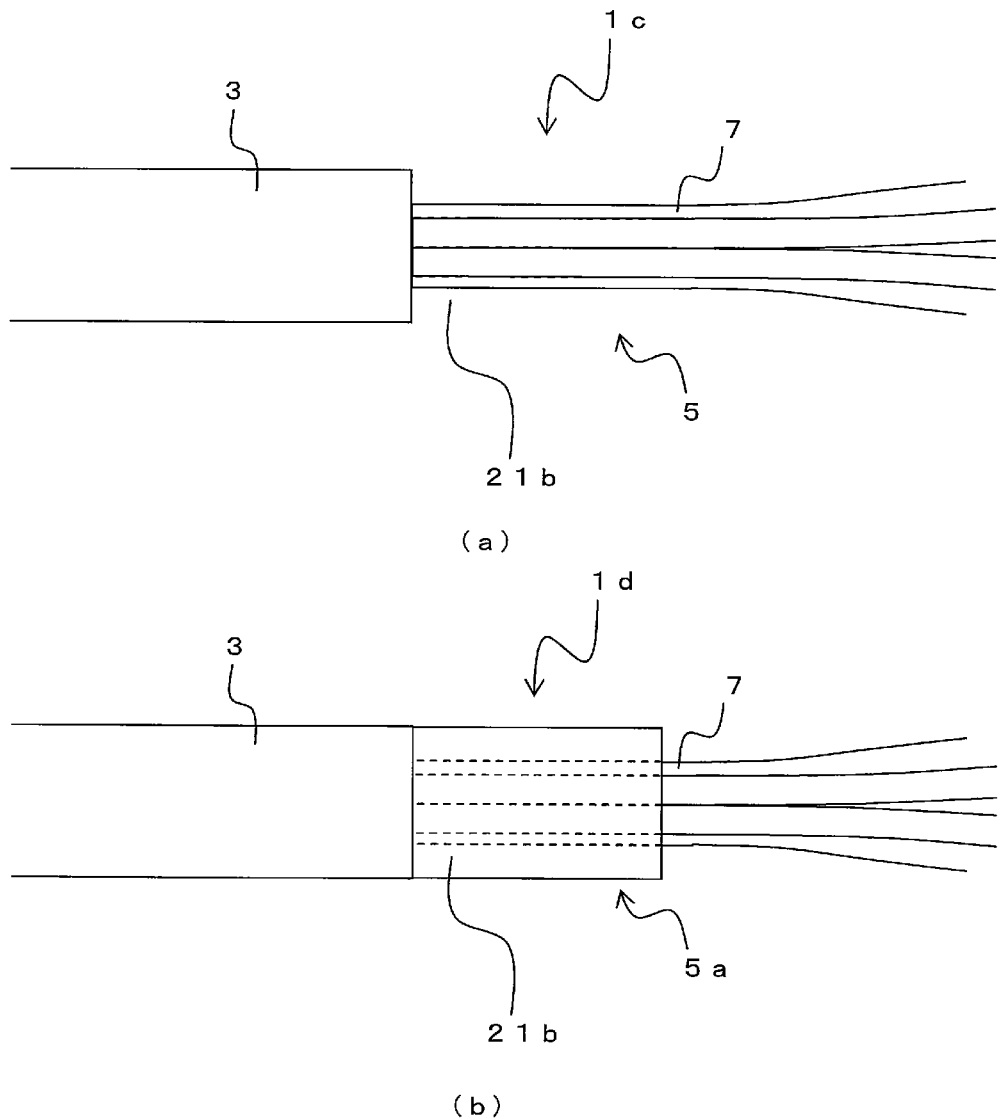
FIG. 4(a) is a view illustrating a fiber connection structure 1c.
FIG. 4(b) is a view illustrating a fiber connection structure 1d.

FIG. 4 is a view illustrating another embodiment. FIG. 4(a) is a view illustrating a fiber connection structure 1c. As illustrated in FIG. 4(a), the bundle structure 5 can be connected directly to the multicore fiber 3. In other words, the multicore fiber 3 does not have to be inserted in the capillary 21a. The multicore fiber 3 and the bundle structure 5 can be connected together by bonding or fusion splice.

FIG. 4(b) is a view illustrating a fiber connection structure 1d. As illustrated in FIG. 4(b), the bundle structure 5a can be connected directly to the multicore fiber 3. In other words, the multicore fiber 3 does not have to be inserted in the capillary 21a. The multicore fiber 3 and the bundle structure 5 can be connected together by bonding or fusion splice. In this case, desirably, the outer diameter of the capillary 21b is substantially identical to the outer diameter of the multicore fiber 3. The foregoing enables more stable connection.

Figure 2:
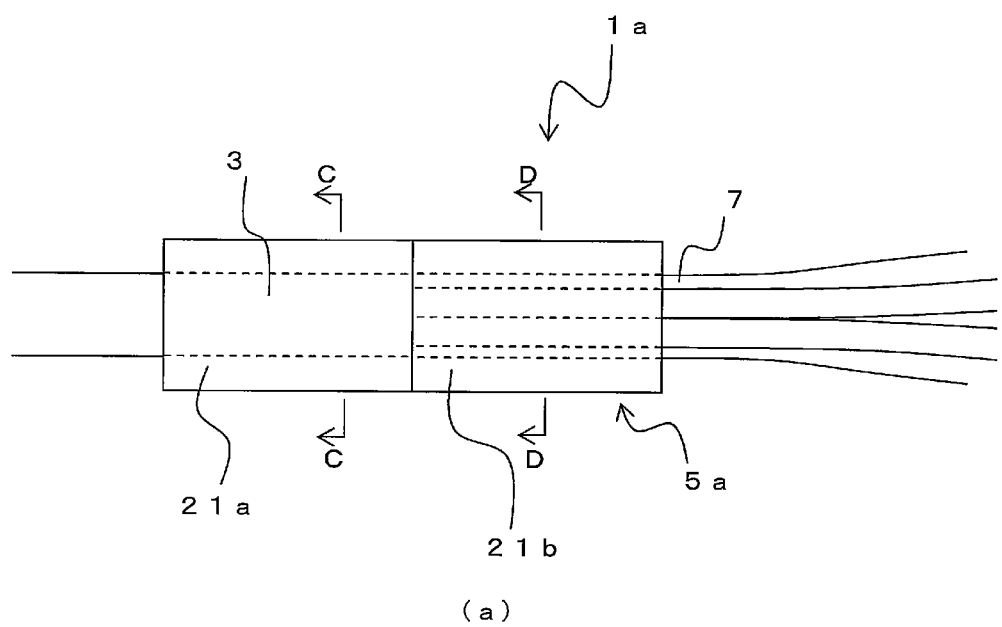
Figure 2:
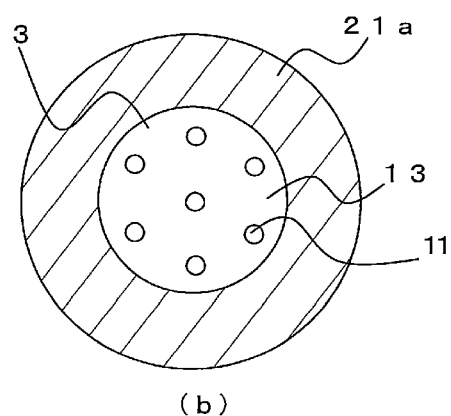
Figure 3:
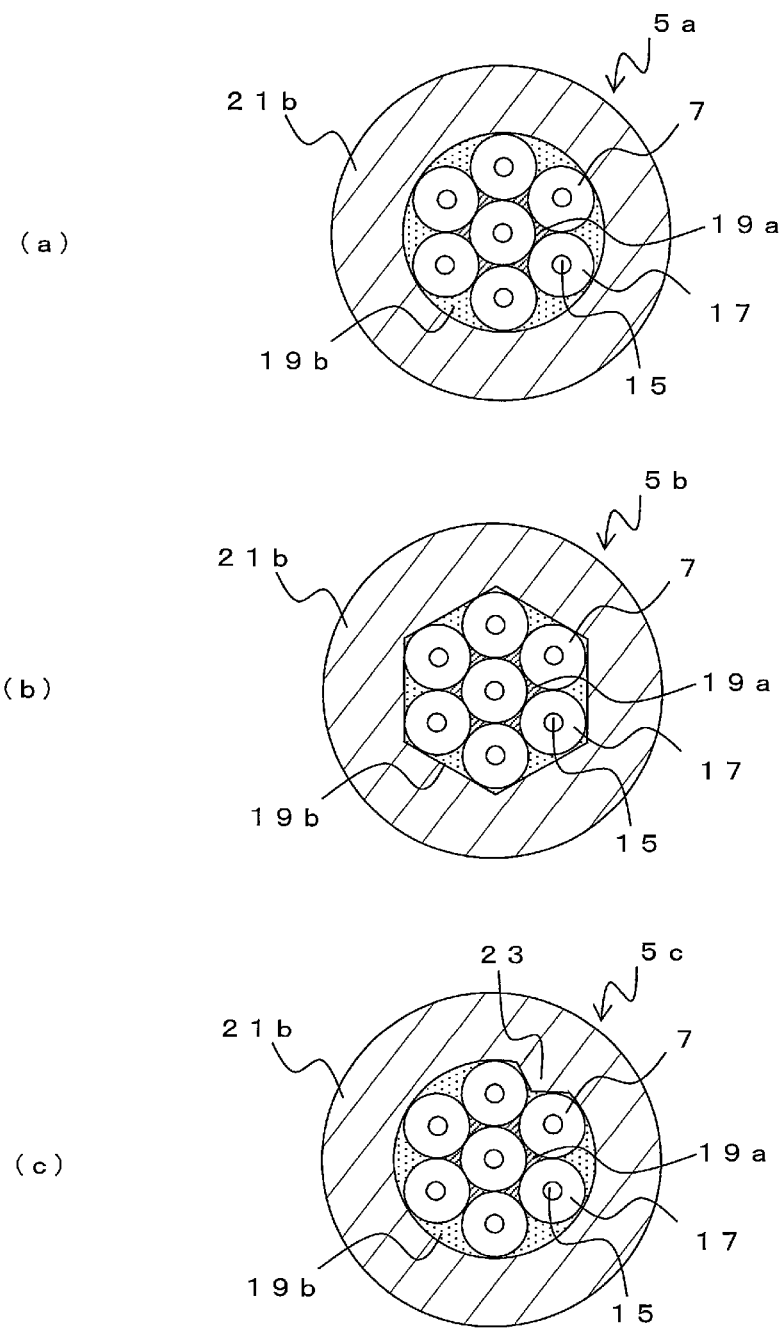
FIG. 3(a) is a view illustrating a bundle structure 5a, showing a cross sectional view along the line D-D specified in FIG. 2(a).
FIG. 3(b) is a view illustrating a bundle structure 5b.
FIG. 3(c) is a view illustrating a bundle structure 5c.

As in the connection structure illustrated in FIG. 4, the connection in the connection structure illustrated in FIG. 2 can be conducted by fusion splice instead of bonding. In this case, a heat-resistant adhesive, a liquid glass, or a glass powder, which are described above, can be used as the adhesives 19a and 19b. Further, the capillary 21b and the optical fibers 7 can be joined by fusion. For example, the optical fibers 7 arranged in the close-packed arrangement can be heated while being inserted in the capillary 21b so that outer surfaces of the optical fibers 7 are fused to the inner surface of the capillary 21b.

The foregoing facilitates fusion splice of the capillaries 21a and 21b thereafter. In the case of fusion splice, the capillaries 21a and 21b are desirably glass capillaries. Glass capillaries are less likely to be deformed by heating to enable stable fusion splice connection.

The capillary 21b can also be made from a heat-shrinkable material. In this case, a distal end of the capillary 21b can be heated with the optical fibers 7 being inserted in the capillary 21b. Desirably, the optical fibers 7 are already bonded together in the close-packed arrangement when the optical fibers 7 are inserted into the capillary 21b. The capillary 21b shrinks by heating so that the optical fibers 7 can be maintained in the close-packed arrangement.

Figure 5:
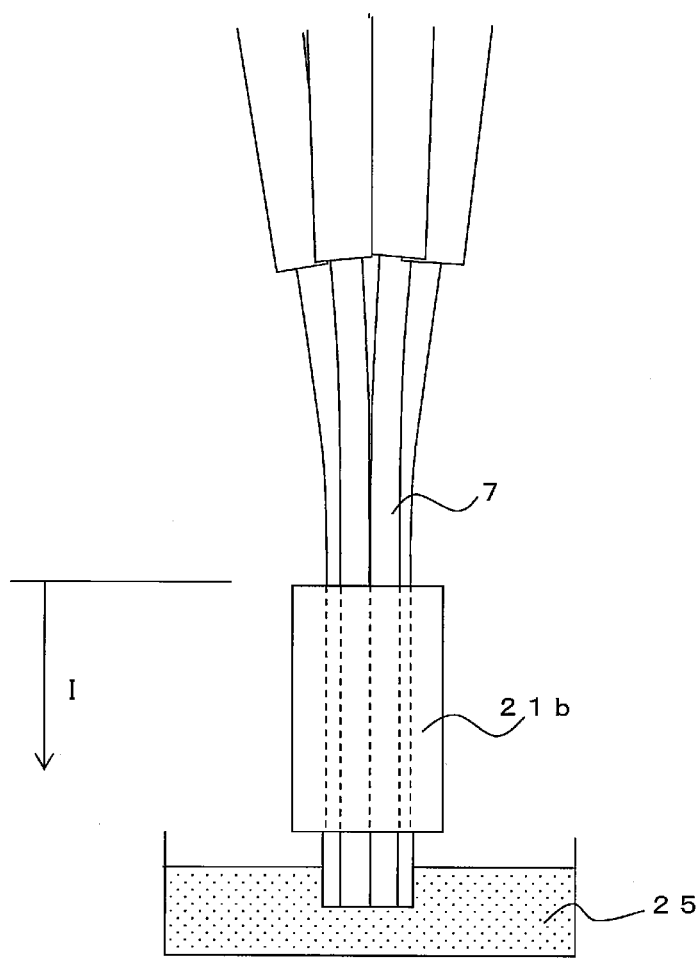
FIG. 5 is a view illustrating a process of producing a bundle structure.

The following describes a method for producing a bundle structure in which the optical fibers 7 are bonded together in the close-packed arrangement, which method is applicable especially to the bundle structures 5a to 5c. First, as illustrated in FIG. 5, coatings of a predetermined number of optical fibers 7 are removed, and then the optical fibers 7 are inserted into the capillary 21b. At this time, the optical fibers 7 are inserted into the capillary 21b such that distal ends of the optical fibers 7 stick out from an end portion of the capillary 21b by the same length (for example about 10 mm). The capillary 21b is temporarily fixed to, for example, the optical fibers 7.

The distal ends of the optical fibers 7 that stick out from the end portion of the capillary 21b are immersed in an adhesive 25 stored in advance in a vessel. The adhesive 25 is, for example, a solution based adhesive in the form of a liquid in which a macromolecular solid such as a synthetic resin is dissolved in a solvent such as water, alcohol, and organic solvent. With such a solution based adhesive, a solute that remains after the solvent is evaporated is cured to bond.

Desirably, the adhesive 25 is further diluted than the concentration of a solute that is commonly used. This makes it possible to reduce the viscosity of the adhesive and the amount of residual solute. Thus, the thickness of a bonding layer formed in spaces between the optical fibers can be reduced so that the distances between the optical fibers 7 can be maintained constant more precisely. Specifically, an adhesive with a weak adhesive force and with a viscosity of, for example, 1000 cps or lower can be used. An adhesive with an extremely low viscosity of 100 cps or lower is more desirable. When the viscosity of the adhesive 25 is set to 100 cps or lower, the space between the bonded optical fibers can be 1 μm or smaller. Further, the shrinkage of the adhesive during curing can produce an advantage that the optical fibers are pulled to one another more tightly. Desirably, the refractive index of the adhesive is less than the refractive index of the claddings of the optical fibers. Further, use of an adhesive with an extremely low viscosity (100 cps or lower) makes it possible to produce a similar advantage without conducting dilution.

Examples of such a solution based adhesive that can be used include an adhesive prepared by thinning "Cemedine C" (trade name) manufactured by Cemedine Co., Ltd. and then dilution with a liquid (it is desirable to add fluorine to adjust the refractive index). As an adhesive (acrylate based adhesive) with an extremely low viscosity, a refractive index controlled resin (UV curable resin) manufactured by NTT-AT can be used. As an adhesive (epoxy based adhesive) with an extremely low viscosity, a heat-curable adhesive manufactured by Epo-Tek can be used. Further, heating an adhesive can further reduce the viscosity of the adhesive so that spaces between the bonded optical fibers can further be reduced.

In the capillary 21b, the optical fibers 7 are inserted substantially in the close-packed arrangement. However, before the distal ends of the optical fibers 7 are immersed in the adhesive 25, it is difficult to perfectly arrange the optical fibers 7 in the close-packed arrangement (constant distance between cores), because a space may be formed between a part of the optical fibers 7 while another part of the optical fibers 7 may tightly be attached to each other.

Figure 6:
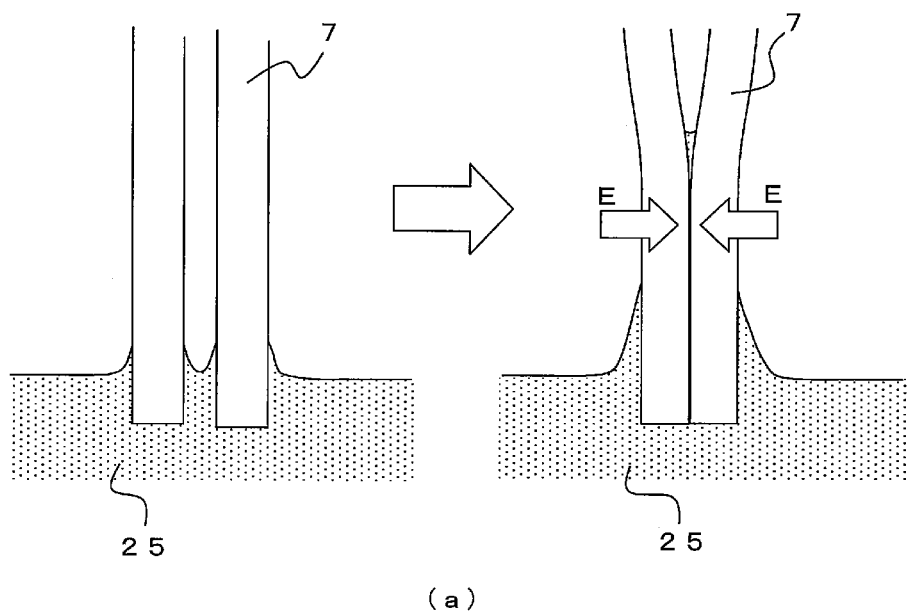
FIG. 6 is a view illustrating a structure in which optical fibers are bonded together.
Figure 6:
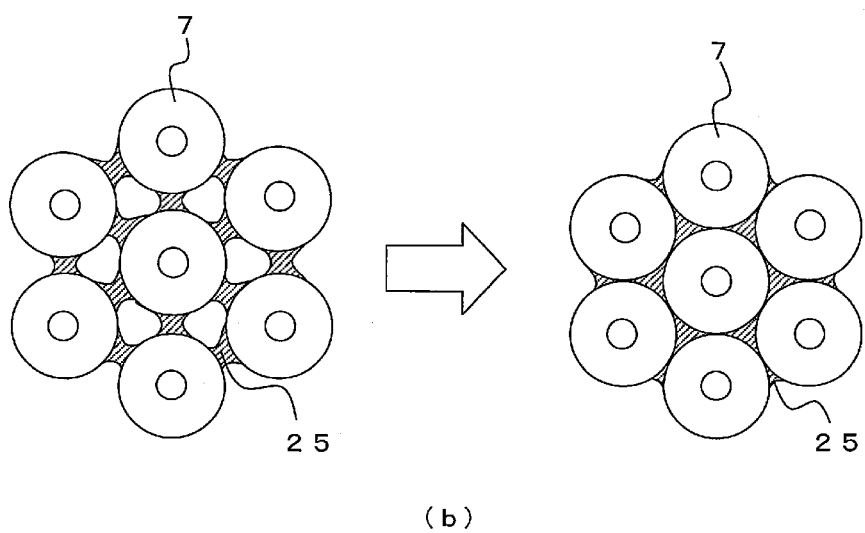

FIG. 6 is a conceptual view illustrating how the optical fibers 7 are bonded together by surface tension of the adhesive 25. FIG. 6(a) is a front view (for simplification, only two optical fibers 7 are illustrated), and FIG. 6(b) is a cross sectional view.

As described above, there are cases in which a space is formed between the optical fibers 7. Since the viscosity of the adhesive 25 is low, the adhesive 25 is drawn up to the space between the optical fibers 7 by surface tension (capillary action). At this time, the optical fibers 7 are tightly attached to each other (in the direction of arrow E in FIG. 6(a)) due to their surface tension.

Specifically, as illustrated in FIG. 6(b), even if some uneven spaces are formed between the optical fibers 7, the adhesive 25 is drawn up to the spaces so that the optical fibers 7 are tightly bonded together. At this time, the surface tension of the adhesive drawn up and existing between the fibers is stabilized, i.e., the optical fibers 7 are reliably arranged in the close-packed arrangement. In this state, the adhesive 25 can be cured to bond the optical fibers 7 together. This advantage is effective especially for the optical fibers 7 that are extremely small (for example, with a diameter of 50 μm or smaller) as in the present invention.

When the height of the adhesive 25 that has been drawn up is excessively high (when the amount of the adhesive 25 that has been drawn up is excessively large), the amount of the adhesive 25 between the end portions of the optical fibers 7 becomes rather excessive. This may increase a space between the optical fibers 7. Thus, the amount of the adhesive 25 to be drawn up by surface tension is desirably equal to or smaller than the amount of the adhesive 25 sufficient to fill the space between the optical fibers 7 in the capillary 21b. Specifically, the amount of the adhesive 25 to be drawn up is desirably adjusted such that in FIG. 5, the height of the adhesive 25 to be drawn up is lower than an upper end of the capillary 21b (I in the figure) and higher than a polished portion, which will be described below.

As to a method for the adjustment, the amount of the adhesive 25 can be adjusted in advance to a minimum necessary amount, or the distal ends of the optical fibers 7 can be removed from the adhesive 25 when the adhesive 25 reaches a predetermined height. By this way, the amount of the adhesive 25 to be drawn up by the optical fibers 7 can be adjusted to $(3^{(0.5)} \times r^2 - 0.5\pi r^2) \times L$ or smaller, where r is the radius of the optical fibers 7 and L is the length of the capillary 21b.

Since the adhesive 25 is a diluted solution type adhesive, spaces are formed by the shrinkage of the adhesive in portions between the cured fibers of the fiber bundle where the fibers are not tightly attached to each other.

Figure 7:
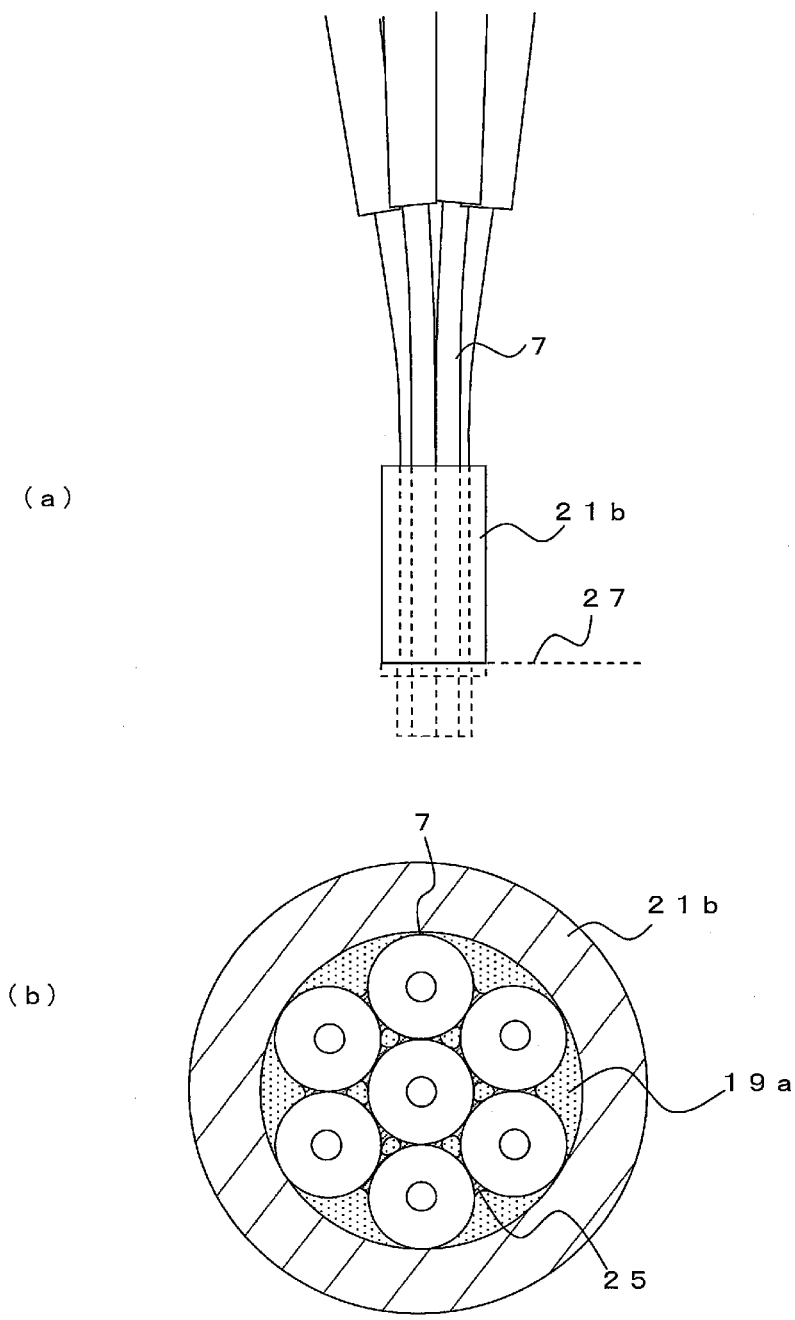
FIG. 7 is a view illustrating how a distal end of a capillary is polished.

Next, as illustrated in FIG. 7, the portions are bonded to the capillary 21b with the optical fibers 7 bonded together in the tightest geometry. As to the adhesive (adhesive 19a) to be used at this time, a heat-curable epoxy based adhesive or a UV-curable acrylate based adhesive can be used. The adhesive 19a fills spaces between the capillary 21b and the fiber bundle and spaces between fibers (between the adhesives 25) to bond the fiber bundle and the capillary together. In the present embodiment, the capillary and the optical fiber bundle are bonded together, but the capillary can be removed to connect only the optical fiber bundle to the multicore fiber.

After the optical fibers 7 are temporarily bonded with the adhesive 25, the optical fibers 7 can be bonded together with the adhesive 19a, and then the optical fibers 7 and the capillary 21b can be bonded together with the adhesive 19b. The optical fibers 7 can be bonded together by surface tension of the adhesive 19a in place of the adhesive 25, and then the optical fibers 7 and the capillary 21b can be bonded together with the adhesive 19b.

Then, the portions of the optical fibers 7 that stick out from the capillary 21b and a part of the capillary 21b are polished up to a polished surface 27. As a result, the bundle structure 5a is formed. Instead of polishing the end surface of the bundle structure to obtain an even surface, for example, the end surface of the bundle structure can be cut with a dicing saw or the like to obtain an even surface.

The viscosity of the adhesive 19a (19b) is desirably low but can be higher than the viscosity of the adhesive 25 (for example, 5000 cps or lower). Desirably, the percentage of shrinkage during curing is low, and the hardness is high (Shore D hardness of 60 or higher). Although the hardness of the adhesive 25 having been cured is desirably high, since the bonding layer becomes significantly thin after having been cured, the hardness of the adhesive 25 has only a small effect on the characteristics at the time of polishing.

Examples of such an adhesive that can be used include "Epo-tek353-ND" (trade name), which is a heat-curable epoxy based adhesive manufactured by EPDXYTECHNOLOGY, "OP-40Z" (trade name), which is an acrylate based UV curable adhesive manufactured by DIC Corporation, and a refractive index controlled resin (UV curable) manufactured by NTT-AT.

As described above, when the fiber connection structure is formed by fusion splice, a heat-resistant adhesive can be used as the adhesive. Alternatively, a glass powder is mixed with a solvent, and the fibers are tightly attached together by the above method using capillary action, followed by volatilization of the solvent so that only the glass powder remains. Specifically, the glass powder fills spaces between the capillary 21b and the optical fibers 7 arranged substantially in the close-packed arrangement so that the optical fibers 7 and the capillary 21b are fixed to each other, and the capillary 21 in this state (bundle structure 5a) and a terminal portion of the multicore fiber 3 can be spliced together directly by fusion splice. In place of the adhesive, a liquid glass (liquid glass/sol-gel glass) can be used.

In the present embodiment, the plurality of optical fibers 7 is inserted in the capillary 21b first. However, the present invention is not limited to this embodiment. For example, the plurality of optical fibers 7 can tightly be attached together and fixed by the same method as in the present embodiment and then inserted into the capillary 21b and fixed with a second adhesive. In this case, the plurality of optical fibers 7 can reliably be fixed in the close-packed arrangement by immersing the plurality of optical fibers 7 in the first adhesive 25 while the plurality of optical fibers 7 is inserted in the cylindrical temporary arrangement member.

The foregoing method facilitates the insertion of the optical fibers 7 into the capillary 21b. Thus, the inside diameter of a clearance of the capillary 21b can be reduced.

In the present embodiment, the adhesive 19a and the adhesive 25 are different adhesives. However, the adhesive 25 can also be used as the adhesive 19a. Specifically, an adhesive that shrinks only a little when cured can be used to avoid formation of spaces between the fibers when the fibers are tightly attached and fixed together with the adhesive 25. In this case, the fibers can tightly be attached together and fixed by use of surface tension of the adhesive 25. In this case, the adhesive 25 desirably has a high hardness (Shore D hardness of 60 or higher).

Desirably, the adhesive 25 has a low refractive index in order to increase the optical confinement effect. However, when optical fibers that can produce an adequate optical confinement effect are used, it is also possible to use the adhesive 25 having a high refractive index.

In order to increase the aggregation effect of the optical fibers 7, the surface wettability of the optical fibers 7 can be increased. As a means for increasing wettability, a method in which a surface treatment agent called a primer is applied and dried and a method using plasma discharge treatment are known. As might be expected, it is desirable to sufficiently clean the optical fibers 7 at the time of operation.

Figure 8:
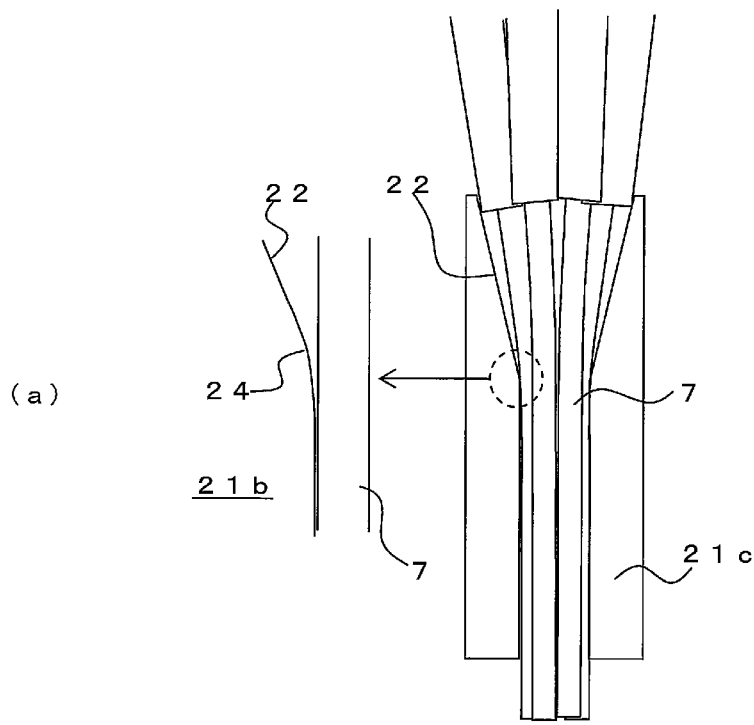
FIG. 8(a) is a view illustrating a capillary 21c.
FIG. 8(b) is a view illustrating a capillary 21d.
Figure 8:
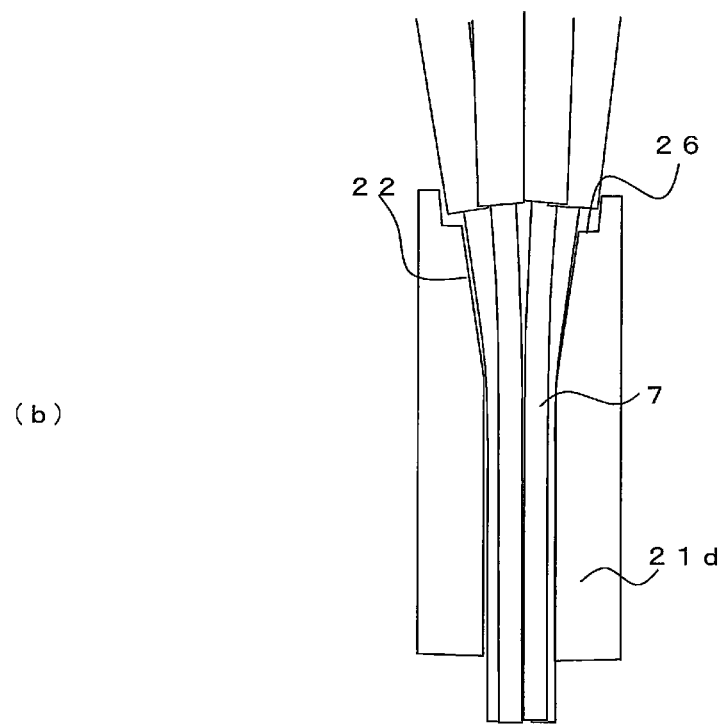

FIG. 8 is a view illustrating a capillary according to another embodiment. As illustrated in FIG. 8(a), a capillary 21c can be used in place of the capillary 21b. The capillary 21c is formed to have a predetermined length such that it completely covers the optical fibers 7 from which the coatings have been removed. Specifically, the capillary 21c is arranged to have its upper edge portion at the position of the coatings of the optical fibers 7. An upper portion of an inner surface of the capillary 21c includes a taper portion 22. Specifically, the hole diameter of the capillary 21c increases at smaller distances from the upper end portion of the capillary 21c. Further, a chamfer portion 24 having an arc-shaped cross section is formed at an interface portion between the taper portion 22 and a straight line portion.

The foregoing makes it possible to reliably protect with the capillary 21c the bare optical fibers from which the coatings have been removed. Further, the taper portion 22 facilitates the insertion of the optical fibers 7. Further, since the interface portion between the taper portion 22 and the straight line portion is the chamfer portion, concentration of force on one portion of the optical fibers 7 can be avoided. Furthermore, an increase in transmission loss due to a bend of the plurality of optical fibers can be prevented Similarly, a capillary 21d illustrated in FIG. 8(b) can be used as the capillary having the taper portion 22. The capillary 21d has substantially the same structure as that of the capillary 21c but is different from the capillary 21c in that depression 26 is formed in an upper end portion of the capillary 21d. The depression 26 corresponds to the coatings of the optical fibers 7. Specifically, when the capillary 21d is used, the coatings of the optical fibers 7 are positioned at the position of the depression 26, and the bare optical fibers 7 are positioned below the taper portion 22. Use of the capillary 21d produces the same advantages as those produced by use of the capillary 21c.

Figure 9:
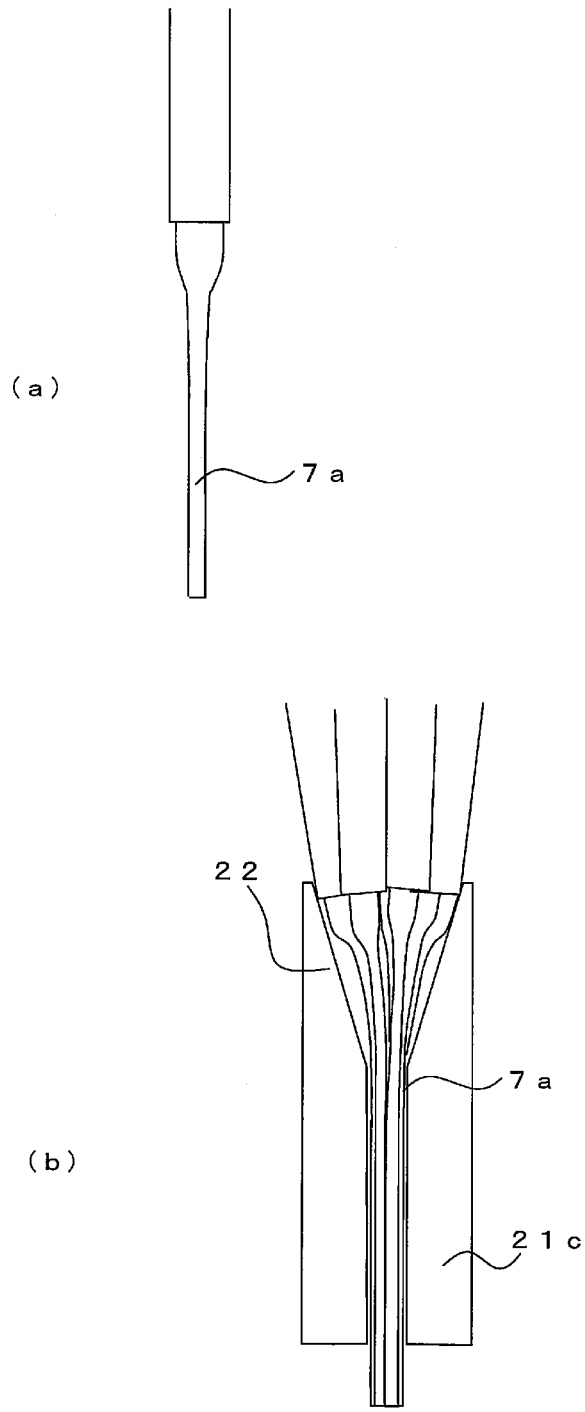

FIG. 9 is a view illustrating an example in which optical fibers 7a are used in place of the optical fibers 7. The optical fibers 7a are similar to the optical fibers 7. However, proximal portions of the fibers exposed from the coatings are thick, while the distal end portions are thin. For example, about 5-mm portions of the optical fibers that are exposed from the coatings have a diameter of 125 µm, whereas the distal end portions have a diameter of, for example, about 45 µm.

Such optical fibers 7a are produced as follows. First, the coating layers on the distal end portions of the optical fibers 7 are removed by a predetermined length. Then, the exposed distal end portions of the optical fibers 7 are immersed in an aqueous solution of hydrofluoric acid such that portions of about 5 mm from the coating layers are not immersed in the aqueous solution. The immersed portions of the optical fibers are etched to have a reduced diameter. When the diameter of each distal end portion becomes about 45 µm, the etching is finished. As a result, the optical fibers 7a having cladding portions that are partially etched to have a reduced diameter can be obtained.

The optical fibers with the distal end portions having a reduced diameter can be produced by any other method. For example, distal end portions of optical fibers having a diameter of 125 µm and optical fibers having a diameter of 45 µm can be spliced together by fusion splice or the like. However, since the fusion splice may cause optical transmission loss, the above method using etching is more desirable.

FIG. 9(b) is a view illustrating the state in which the optical fibers 7a are inserted in the capillary 21c. In this case, the capillary 21c holds the optical fibers 7a up to the coatings, and the optical fibers 7a that have been reduced in diameter are arranged in the close-packed arrangement in the capillary 21c. Other capillary such as the capillaries 21b and 21d is applicable to the optical fibers 7a. Further, the optical fibers 7a can be used in place of the optical fibers 7 in any embodiment other than that illustrated in FIG. 9(b).

Figure 10:
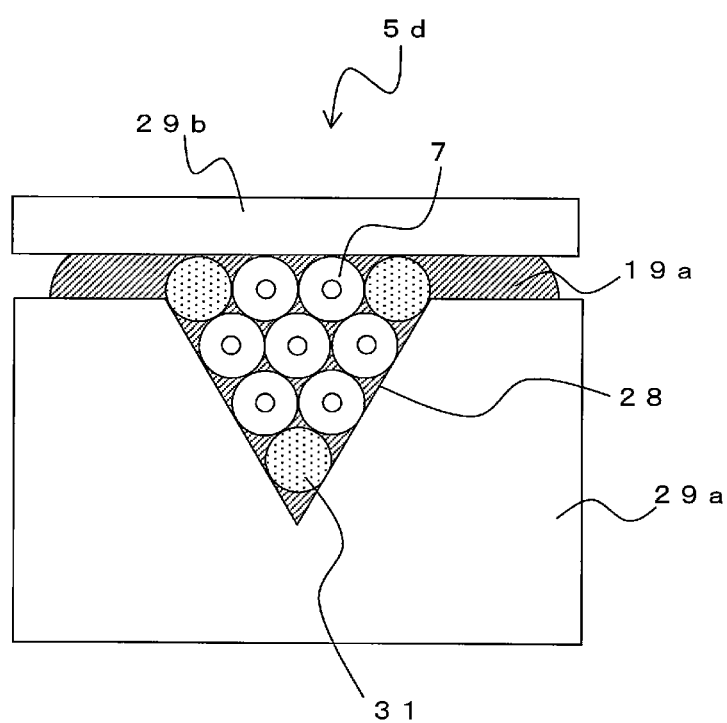
FIG. 10 is a view illustrating a bundle structure 5d.

FIG. 10 is a view illustrating a bundle structure 5d according to another embodiment. The bundle structure 5d is formed as follows. First, dummy fibers 31 and the optical fibers 7 are disposed in a holding member 29a including an upper surface having a V groove 28. The dummy fibers 31 can be any dummy fiber having the same diameter as that of the optical fibers 7. The angle of a lower portion of the V groove 28 is substantially 60 degrees.

The dummy fibers 31 are provided at a lowermost portion and both end portions of an uppermost portion of the V groove 28. Specifically, the dummy fibers 31 and the optical fibers 7 are arranged in the shape of a substantially equilateral triangle such that the dummy fibers 31 are at vertexes. Thus, the optical fibers 7 excluding the dummy fibers 31 are reliably arranged hexagonally in the close-packed arrangement.

In the foregoing state, the holding member 29a, the optical fibers 7, and the dummy fiber 31 are pushed from above with a holding member 29b, which is in the shape of a plate, so that the holding members 29a and 29b, the optical fibers 7, and the dummy fiber 31 are bonded together with the adhesive 19a. After the adhesive 19a is cured, an end surface is polished to thereby form the bundle structure 5d. In this case, the holding members 29a and 29b function similarly to the capillary 21b, and the holding members 29a and 29b and the capillary 21a on the multicore fiber side are spliced together.

Figure 11:
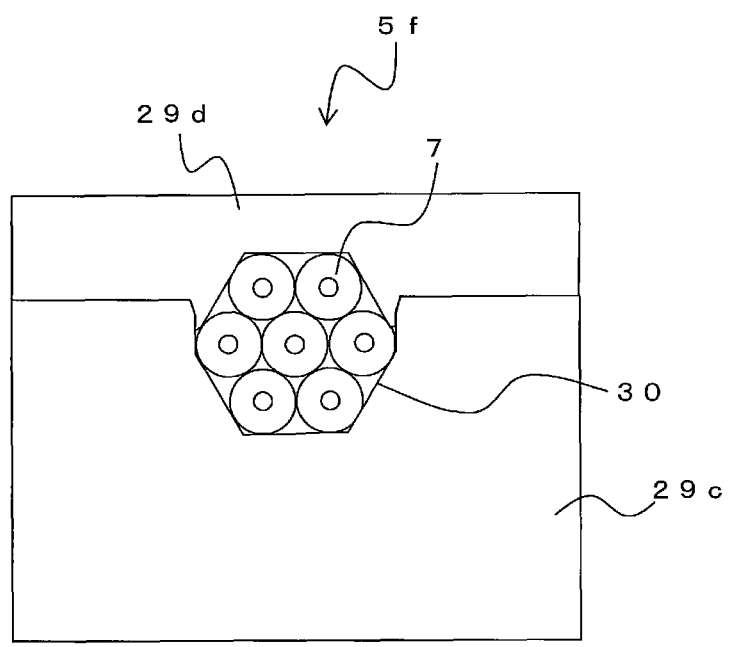
FIG. 11 is a view illustrating a bundle structure 5f.

FIG. 11 is a view illustrating a bundle structure 5f according to another embodiment. The bundle structure 5f is formed as follows. First, optical fibers 7 are disposed in a holding member 29c including an upper surface having a groove 30. The groove 30 has a shape (shape of a portion of a regular hexagon) corresponds to the outer shape of the optical fibers 7 arranged in the close-packed arrangement.

In the groove 30, the optical fibers 7 are arranged in the close-packed arrangement. A holding member 29d is provided so as to cover the groove 30 and the optical fibers 7. The holding member 29d and the groove 30 form a substantially hexagonal cross sectional space. Thus, the optical fibers 7 are maintained in the close-packed arrangement in the space.

Desirably, the holding member 29d is made from a material that has a low hardness and can be deformed with ease. For example, the holding member 29d is made from a resin containing no filler. The holding member 29d is made from such a material so that the holding member 29d reliably pushes the optical fibers 7 to reliably maintain the optical fibers 7 in the close-packed arrangement.

In the foregoing state, the optical fibers 7 stick out from an end portion of the bundle structure 5f and are bonded together by a similar method to those illustrated in FIGS. 5 to 7 (by use of the holding members 29c and 29d in place of the capillary 21b). Further, the adhesive can be applied or fused by a different method.

Figure 12:
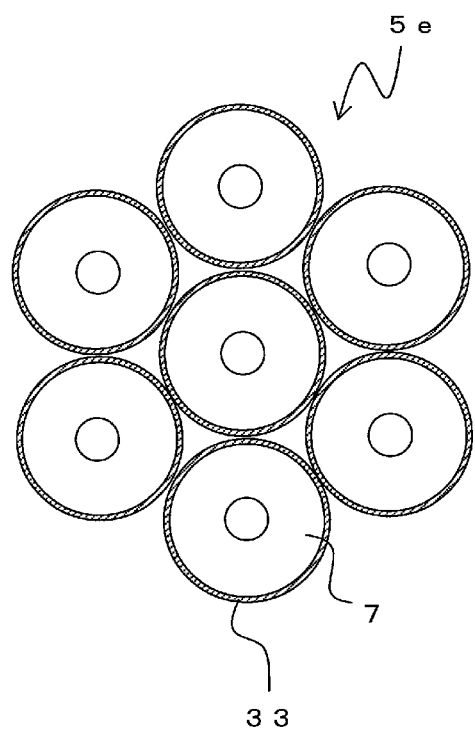
FIG. 12 is a view illustrating a bundle structure 5e.

FIG. 12 is a view illustrating a bundle structure 5e according to another embodiment. In the bundle structure 5e, a coating agent 33 is provided on the circumferences of optical fibers 7. As to the coating agent 33, a low-melting-point glass or metal is applicable.

As described above, the optical fibers 7 are made from a silica glass or the like. Thus, the melting point of the optical fibers 7 is significantly high. On the other hand, the melting point of a low-melting-point glass or metal (aluminum, etc.) is lower than the melting point of the optical fibers 7. Thus, the optical fibers 7 and the coating agent 33 can be fused together by heating with the optical fibers 7 being arranged in the close-packed arrangement. At this time, the coating agent 33 melts during the heating so that the optical fibers 7 pull one another by surface tension, whereby the close-packed arrangement can be formed more reliably.

The coating agent 33 can be formed on the optical fibers 7 by any method such as evaporation, sputtering, and plating. Further, in order to arrange the optical fibers in the close-packed arrangement prior to the heating, for example, the holding member illustrated in FIG. 10 can be used.

Figure 13:
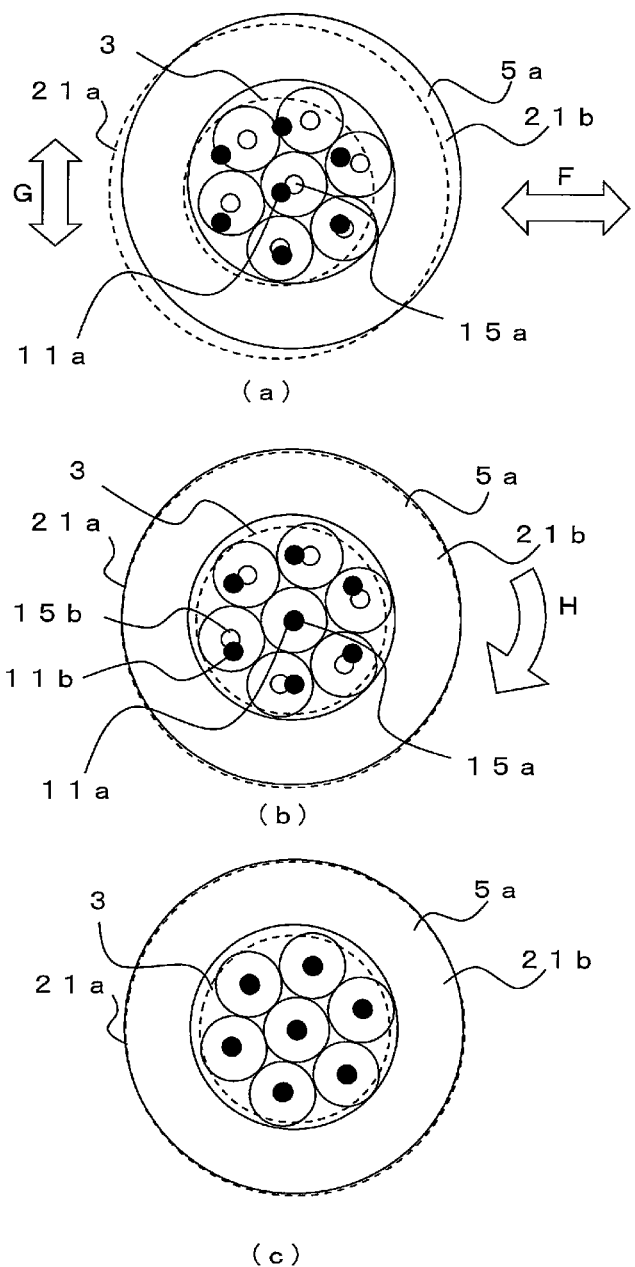

The following describes in detail a method for the alignment of cores of a bundle structure and a multicore fiber. FIG. 13 is a view illustrating a method for the alignment of the cores of the bundle structure 5a and the multicore fiber 3. In FIG. 13, the multicore fiber 3 is indicated in dotted lines (core portions are shown in black circles), and the bundle structure 5a is indicated in solid lines (core portions are shown in open circles). Although the following describes the example using the bundle structure 5a, the method is also applicable to a bundle structure according to any other embodiment.

First, as illustrated in FIG. 13(a), while the multicore fiber 3 and the bundle structure 5a are disposed to face each other (the distance between end surface of the multicore fiber 3 and the bundle structure 5a is, for example, 5 µm), the central core 11a of the multicore fiber 3 and the central core 15a of the bundle structure 5a are aligned with each other. At this time, for example, while light is applied from the multicore fiber side, the multicore fiber 3 (capillary 21a) is moved in the direction X and in the direction Y (directions F and G), which is perpendicular to the direction X, with respect to the bundle structure 5a (capillary 21b).

As illustrated in FIG. 13(b), when the cores 11a and 15a are aligned, for example, the intensity of light detected by a light detection unit connected to the core 15a becomes the maximum. The light can be applied from the core 15a side and can be detected at the core 11a side.

In the foregoing state, the multicore fiber 3 (capillary 21a) is rotated about a center of a cross section of the capillary 21a as a rotation axis (in the direction of arrow H in FIG. 13(b)) with respect to the capillary 21b. At this time, for example, light is applied from the core 11 side and detected at the core 15 side.

As illustrated in FIG. 13(c), when the cores 11 and 15 are aligned, for example, the intensity of light detected by the light detection unit connected to the core 15 becomes the maximum. The light can be applied from the core 15 side and detected at the core 11 side.

It is also possible to align the cores by moving (rotating) the capillary 21b. However, the core alignment by moving (rotation) the multicore fiber 3 can make a clearance from the capillary 21a smaller. As a result, the position of the center of the capillary 21a substantially corresponds to the position of the center of the multicore fiber 3. Therefore, when the capillary 21a is rotated about the center of the cross section as the rotation axis, the substantial center of the cross section of the multicore fiber 3 becomes the rotation axis.

On the capillary 21b side, on the other hand, it is necessary to insert the plurality of optical fibers 7. Therefore, a larger clearance than the clearance between the capillary 21a and the multicore fiber 3 is necessary. Thus, the position of the center of the cross section of the capillary 21b and the position of the center of the cross section of the optical fibers 7 arranged in the close-packed arrangement may deviate. Therefore, when the center of the cross section of the capillary 21b is the rotation axis, the center of the cross section of the optical fibers 7 arranged in the close-packed arrangement is not the rotation axis. This may cause misalignment of the core 15a at the center. Accordingly, it is desirable to fix the capillary 21b and rotate the capillary 21a.

It is also possible to repeat the alignment of the central cores and the alignment of the rest of the cores such that the intensity of light detected at each core becomes the maximum. After the above core alignment is finished, five-point core alignment (a method for the core alignment in which from the intensity of light detected at five points including the current position, ±direction X, and ±direction Y, the current state of axis misalignment is calculated to move in the most appropriate directions by the most appropriate amounts) can be used. After the core alignment is finished, the optical fibers 7 in the above state can be spliced together and fixed with an adhesive or the like.

Any other method for the alignment of cores can also be used. For example, arbitrary two cores are aligned first, and then the rest of the cores are aligned. Specific methods are as follows. First, two cores positioned at both ends on the X axis across the central fiber are aligned by adjusting XY and rotations. From this state, the state of axis misalignment (axis misalignment in X and Y directions) of every optical fiber is measured to move in the most appropriate direction by the most appropriate amount.

As used herein, the most appropriate direction and the most appropriate amount refer to adjustment of the state such that the amount of axis misalignment of a core with the maximum axis misalignment is reduced to be as small as possible. Any other method can also be used such as a method in which the average of overall axis misalignment is reduced and a method in which the average of squares is reduced (method of least squares).

According to the embodiment of the present invention, the optical fibers 7 arranged in the close-packed arrangement are integrated. Thus, the distances between the optical fibers 7 can be maintained constant with ease. Therefore, the cores 11 of the multicore fiber 3 and the cores 15 of the optical fibers 7 can reliably be optically connected together.

Especially, since the optical fibers 7 arranged in the close-packed arrangement are bonded together and supported by the capillary or the holding member, it is easy to conduct connection operation. Further, the hole of the capillary 21b is formed in the shape of a hexagon, or the protrusion 23 is formed on the inner surface, whereby the direction of the close-packed arrangement of the optical fibers 7 with respect to the capillary 21b can be regulated. Thus, for example, marks by which the positions of the optical fibers 7 inside the capillary 21b can be recognized are indicated on the circumference of the capillary 21b, it becomes easy to recognize the core positions during core alignment operation.

Further, in order to arrange the optical fibers in the close-packed arrangement, surface tension of the diluted adhesive 25 can be used so that the optical fibers 7 can be arranged in the close-packed arrangement and bonded together easily and reliably. At this time, the optical fibers 7 arranged in the close-packed arrangement are bonded to the capillary 21b with an adhesive having a higher viscosity and a higher hardness, and an end surface is polished, whereby the capillary 21b and the optical fibers 7 can reliably be joined. Furthermore, the distal ends of the optical fibers 7 would not be damaged during the polishing.

Further, use of the dummy fibers 31 to arrange the optical fibers 7 in the close-packed arrangement makes it possible to reliably arrange the optical fibers 7 in the close-packed arrangement by use of the simple V groove 28.

Although the embodiments of the present invention have been described above with reference to the accompanying drawings, the technical scope of the present invention is not limited to the embodiments. It will be apparent to those skilled in the art that various modifications and variations can be made to the present invention without departing from the spirit and scope of the invention set forth in the appended claims. Thus, it is intended that the present invention covers such modifications and variations.

Figure 14:
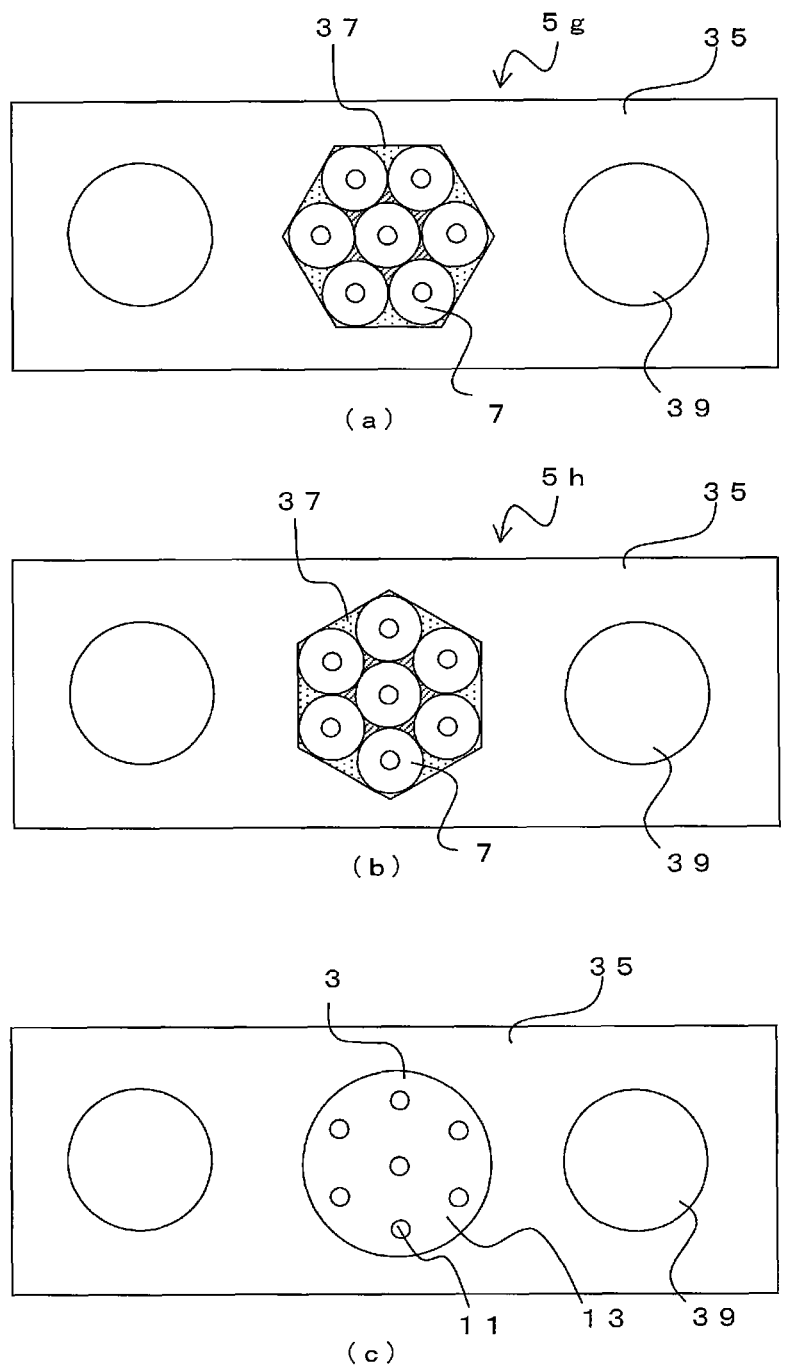
FIG. 14 is a view illustrating another bundle structure.

For example, the bundle structure does not have to use a capillary having a circular cross section. FIG. 14(a) is a view illustrating a bundle structure 5g. The bundle structure 5g uses an MT connector 35. The MT connector 35 includes a hole 37. The hole 37 is substantially hexagonal. The hole 37 functions as a capillary in which the optical fibers 7 are to be inserted. Specifically, in the bundle structure 5g, the plurality of optical fibers 7 is arranged in the close-packed arrangement in the MT connector 35 having the capillary (hole 37). The bundle structure 5g can be produced by, for example, a method illustrated in FIGS. 5 to 7.

In the bundle structure 5g, a pair of guide holes 39 are formed in both side portions of the hole 37. In the guide holes 39, guide pins are to be inserted when another connector is connected. With the guide pins, the plurality of optical fibers can be aligned.

FIG. 14(b) is a view illustrating a bundle structure 5h. The bundle structure 5h has substantially the same structure as that of the bundle structure 5g but is different in the direction of the hexagon of the hole 37. In the present invention, the direction of the hole 37 can be any direction. The hole 37 is formed to be slightly larger than the outer shape of the optical fibers 7 arranged in the close-packed arrangement. Thus, in order to more reliably arrange the optical fibers 7 in the close-packed arrangement without spaces, it is desirable to push the optical fibers 7 in the direction of any of the angles of the hexagonal hole 37.

As to the multicore fiber 3 connectable to the bundle structure 5g or 5h, as illustrated in FIG. 14(c), the multicore fiber 3 can be fixed to the MT connector 35 and formed. By this way, the bundle structure 5g or 5h and the multicore fiber 3 can be connected together with ease.

Although the foregoing embodiment describes the bundle structure of the multicore fiber having seven cores, the present invention is not limited to the embodiment. For example, the present invention is also applicable to a multicore fiber having 19 cores in which one additional core layer is included. In this case, similar advantages as those of the above embodiment can be produced by producing a bundle structure including 19 optical fibers by the same method.

FIG. 15(a) is a view illustrating a jig 83 for use in production of a bundle structure having 19 cores. In the jig 83, a hole 85 is formed at the center, and twelve holes 87 are formed around the hole 85 substantially on the lines of a hexagon. The optical fibers 7 bundled together in advance are inserted in the hole 85. Specifically, seven optical fibers 7 (temporarily) arranged in the close-packed arrangement at the cross section are inserted into the hole 85. Further, the optical fibers 7 are inserted in each of the holes 87.

Figure 15:
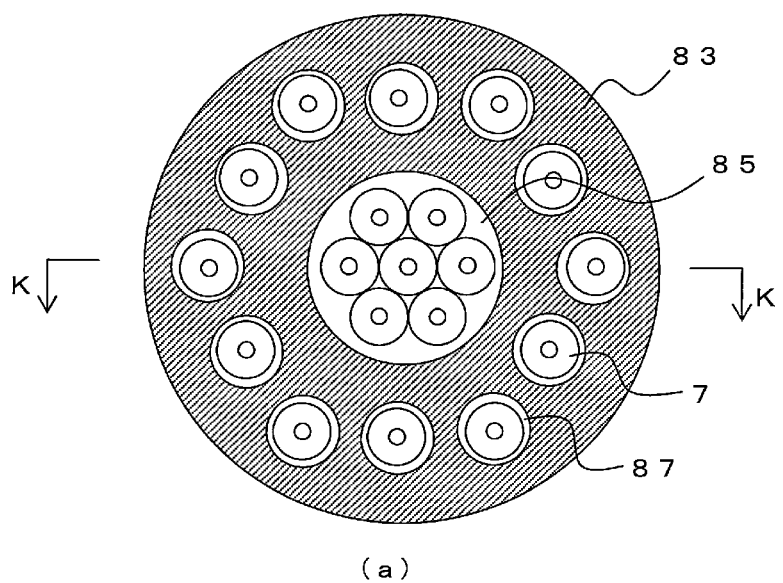
FIG. 15 is a view illustrating jig s 83 and 89.
Figure 15:
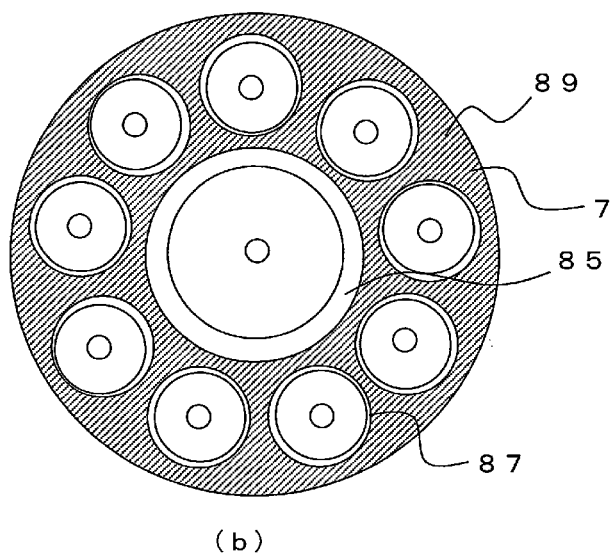
Figure 16:
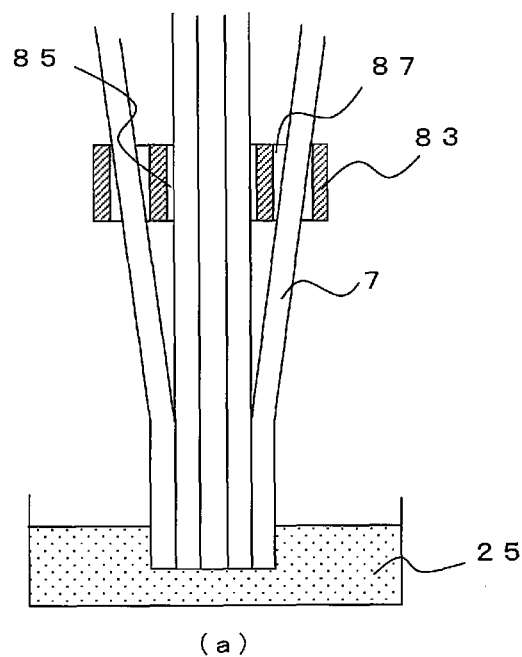
FIG. 16 is a view illustrating a process of producing a bundle structure by use of the jig 83.
Figure 16:
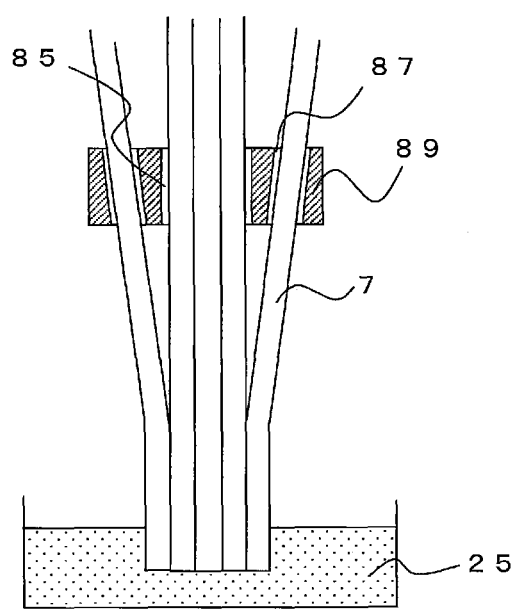

FIG. 16(a) is a cross sectional view along the line K-K specified in FIG. 15. The optical fibers 7 are immersed in the adhesive 25 such that the distal end portion of the bundled seven optical fibers 7 at the center and the distal end portions of the optical fibers 7 around the bundled seven optical fibers 7 come into contact with one another. By this way, 12 optical fibers 7 are tightly attached by surface tension to the circumferences of the seven optical fibers 7 arranged in the close-packed arrangement.

As illustrated in FIG. 16(b), the hole 87 can be formed obliquely in the direction in which the optical fibers 7 are to be inserted. The positions and sizes of the holes 85 and 87 of the jig 83 can be set as appropriate according to the number of optical fibers to be bundled.

The core pitch of the multicore fiber does not have to be constant. In this case, the outer diameters of the fibers to be bundled (the outer diameters are not the same but different from one another) can be selected as appropriate according to the core pitch of the multicore fiber.

In the case, the jig 89 as illustrated in FIG. 15(b) can be used. For example, the central optical fiber 7 with a large diameter can be inserted into the hole 85, and the optical fibers 7 with a smaller diameter around the central optical fiber 7 can be inserted into the holes 87. Further, the distal ends of the optical fibers 7 are immersed in an adhesive or the like so that a bundle structure in which the optical fibers 7 are tightly attached to one another can be obtained.

Figure 17:
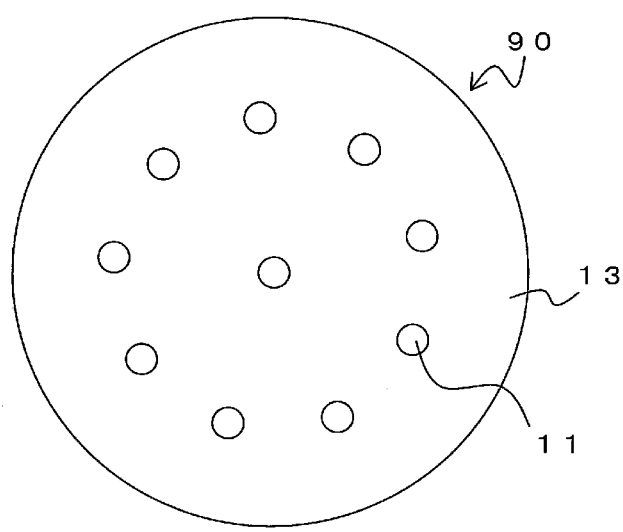
FIG. 17 is a view illustrating a multicore fiber 90 and a bundle structure 91.
Figure 17:
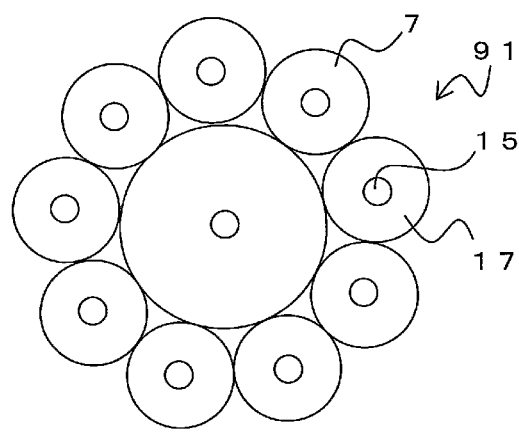

FIG. 17(a) is a view illustrating a multicore fiber 90 having 10 cores. FIG. 17(b) is a view illustrating a bundle structure 91 produced by the method illustrated in FIG. 15(b). As illustrated in FIG. 17(a), the multicore fiber 90 has 10 cores formed in cladding 13. Specifically, nine cores 11 are formed around a central core 11 at a pitch of 40° with respect to the central core 11.

As illustrated in FIG. 17(b), the bundle structure 91 includes the optical fibers 7 arranged to be connectable to the multicore fiber 90. The optical fibers 7 are tightly attached together and fixed so that the optical fibers 7 can be connected to the multicore fiber 90. As to a bundle structure corresponding to a multicore fiber having one core at the center and n cores around the core at the center that are evenly spaced, the radius R of claddings 17 of the optical fiber 7 at the center and the radius r of the optical fibers 7 disposed around the optical fiber 7 at the center are defined by the formula below.

$$R = \frac{1 - \sin\left(\frac{180}{n}\right)}{\sin\left(\frac{180}{n}\right)} r \qquad \text{[Formula 1]}$$

The radius of the optical fiber at the center and the radius of the optical fibers around the optical fibers at the center are determined so as to satisfy the above relationship so that the bundle structure connectable to the multicore fiber as described above can be obtained.

EXPLANATION OF REFERENCE NUMERALS 1, 1a . . . Fiber connection structure
3, 90 . . . Multicore fiber
5, 5a, 5b, 5c, 5d, 5e, 5f, 5g, 5h, 91 . . . Bundle structure
7, 7a . . . Optical fiber
9 . . . Adhesive
11, 11a . . . Core
12 . . . Electrode
13 . . . Cladding
15, 15a . . . Core
17 . . . Cladding
19a, 19b . . . Adhesive
21a, 21b, 21c, 21d . . . Capillary
22 . . . Taper portion
23 . . . Protrusion
24 . . . Chamfer portion
25 . . . Adhesive
27 . . . Polished surface
28 . . . V groove
29a, 29b, 29c, 29d . . . Holding member
30 . . . Groove
31 . . . Dummy fiber
33 . . . Coating
35 . . . MT connector
37 . . . Hole
39 . . . Guide hole
83, 89 . . . jig
85, 87 . . . Hole

The invention claimed is:
1. A method for producing a bundle structure including a plurality of optical fibers connectable to a multicore fiber having a plurality of cores, the method comprising:
 inserting a plurality of optical fibers arranged substantially in a close-packed arrangement into a capillary such that distal ends of the plurality of optical fibers stick out from an end surface of the capillary by an identical length;
 bringing only the distal ends of the plurality of optical fibers into contact with a first adhesive so that the first adhesive is drawn up to a space between the optical fibers and the plurality of optical fibers are tightly attached and bonded together by surface tension of the first adhesive drawn up to the space between the optical fibers; and after the first adhesive is cured, fixing the capillary and the plurality of optical fibers to each other and polishing the end surface of the capillary to obtain the plurality of optical fibers arranged in a close-packed arrangement.

2. A method for producing a bundle structure including a plurality of optical fibers connectable to a multicore fiber having a plurality of cores, the method comprising:

inserting a plurality of optical fibers arranged substantially in a close-packed arrangement into a temporary arrangement member such that distal ends of the plurality of optical fibers stick out from an end surface of the temporary arrangement member by an identical length;

bringing only the distal ends of the plurality of optical fibers into contact with a first adhesive so that the first adhesive is drawn up to a space between the optical fibers and the plurality of optical fibers are tightly attached and bonded together by surface tension of the first adhesive drawn up to the space between the optical fibers to form an optical fiber bundle; and after the first adhesive is cured, removing the optical fiber bundle from the temporary arrangement member and polishing an end surface of the optical fiber bundle to obtain the optical fiber bundle arranged in a close-packed arrangement.

3. The method of claim 2, further comprising, before the end surface of the optical fiber bundle is polished, inserting the optical fiber bundle into a capillary, fixing the optical fiber bundle and the capillary to each other, and polishing the end surface of the optical fiber bundle together with the end surface of the capillary.

4. The method of claim 1, wherein fixing the capillary and the plurality of optical fibers to each other is executed with a second adhesive, and the refractive index of the first and second adhesive is less than the refractive index of claddings constituting the plurality of optical fibers.

5. The method of claim 1, wherein the first adhesive is a solution based adhesive, and wherein the concentration of a main component of the adhesive with respect to the solution is 50% or lower.

6. The method of claim 1, wherein the first adhesive has a cure shrinkage percentage of 10% or higher.

7. The method of claim 1, wherein the first adhesive has a viscosity of 1000 cps or lower.

8. The method of claim 1, wherein fixing the capillary and the plurality of optical fibers to each other is executed with a second adhesive, and the second adhesive having been cured has a Shore D hardness of 60 or higher.

9. The method of claim 1, wherein a hexagonal hole corresponding to the close-packed arrangement of the plurality of optical fibers is formed in the capillary, and wherein the plurality of optical fibers is inserted into the hexagonal hole and fixed.

10. The method of claim 1, wherein an inner surface of the capillary has a protrusion formed at a position corresponding to at least one depressed portion of a circumference formed between any of the plurality of optical fibers arranged in the close-packed arrangement.

11. A method for connecting fibers, comprising:
producing a bundle structure by the method for producing a bundle structure according to claim 1; and
splicing a multicore fiber inserted in a first capillary to the bundle structure inserted in a second capillary by splicing the first capillary and the second capillary together.

12. The method of claim 11, wherein the refractive index of a third adhesive with which the multicore fiber and the first capillary are bonded together is less than the refractive index of a cladding of the multicore fiber.

13. A method for connecting a multicore fiber having a plurality of cores to a bundle structure including a plurality of optical fibers, the method comprising:

producing a bundle structure by the method for producing a bundle structure according to claim 1 by at least inserting a plurality of optical fibers arranged substantially in a close-packed arrangement into a capillary, bonding the plurality of optical fibers and the capillary together with a heat-resistant adhesive, and polishing an end surface of the capillary to form a bundle structure; and connecting the bundle structure by fusion splice to a multicore fiber inserted in another capillary.

14. A method for connecting a multicore fiber having a plurality of cores to a bundle structure including a plurality of optical fibers, the method comprising:

producing a bundle structure by the method for producing a bundle structure according to claim 1 by at least heating a plurality of optical fibers arranged substantially in a close-packed arrangement and inserted in a capillary, fusing the plurality of optical fibers and the capillary together, and polishing an end surface of the capillary to form a bundle structure; and connecting the bundle structure by further fusion splice to a multicore fiber inserted in another capillary.

15. A method for connecting a multicore fiber having a plurality of cores to a bundle structure including a plurality of optical fibers, the method comprising:

producing a bundle structure by the method for producing a bundle structure according to claim 1 by at least inserting a plurality of optical fibers arranged substantially in a close-packed arrangement into a capillary, bonding the plurality of optical fibers and the capillary together with a liquid glass or a glass powder, and polishing an end surface of the capillary to form a bundle structure; and connecting the bundle structure by fusion splice to a multicore fiber inserted in another capillary.

16. A method for connecting fibers, comprising:

producing a bundle structure by the method for producing a bundle structure according to claim 1; and aligning a central core of a multicore fiber with a corresponding core of the bundle structure by active alignment, aligning one or two cores around the central core of the multicore fiber with a corresponding core of the bundle structure by active alignment, and then bonding the multicore fiber and the bundle structure together.

17. A bundle terminal structure comprising:

a substantially cylindrical capillary; and a plurality of optical fibers, wherein the plurality of optical fibers is inserted in the capillary such that in the capillary, the plurality of optical fibers is substantially in a close-packed arrangement at a cross section thereof and is joined such that adjacent optical fibers of the plurality of optical fibers are in contact with each other, and wherein a space is formed between an inner surface of the capillary and a bundle structure of the plurality of optical fibers joined in a close-packed arrangement.

18. A fiber connection structure comprising the bundle terminal structure according to claim 17, wherein a space between the capillary and the plurality of optical fibers arranged substantially in the close-packed arrangement is filled with a glass powder, and wherein a terminal portion of the capillary and a terminal portion of a multicore fiber are spliced together by fusion splice.

* * * * *